United States Patent
Pestana et al.

(10) Patent No.: US 12,314,982 B2
(45) Date of Patent: *May 27, 2025

(54) DECENTRALIZED PRIVACY-PRESERVING REWARDS WITH CRYPTOGRAPHIC BLACK BOX ACCUMULATORS

(71) Applicant: Brave Software, Inc., San Francisco, CA (US)

(72) Inventors: Goncalo Pestana, London (GB); Benjamin Livshits, London (GB)

(73) Assignee: Brave Software, Inc., San Fransisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,576

(22) Filed: May 12, 2023

(65) Prior Publication Data
US 2023/0281671 A1  Sep. 7, 2023

Related U.S. Application Data

(63) Continuation of application No. 17/244,923, filed on Apr. 29, 2021, now Pat. No. 11,694,234.
(Continued)

(51) Int. Cl.
*G06Q 30/02*  (2023.01)
*G06F 21/62*  (2013.01)
(Continued)

(52) U.S. Cl.
CPC ..... *G06Q 30/0273* (2013.01); *G06F 21/6263* (2013.01); *G06Q 30/0277* (2013.01);
(Continued)

(58) Field of Classification Search
CPC ....... G06Q 30/0273; G06Q 30/0207–30/0277; G06F 21/6263; G06F 21/606;
(Continued)

(56) References Cited

U.S. PATENT DOCUMENTS

| | | | |
|---|---|---|---|
| 7,076,479 B1 * | 7/2006 | Cheung | G06Q 30/02 707/999.005 |
| 7,100,111 B2 * | 8/2006 | McElfresh | G06Q 30/0273 705/14.69 |

(Continued)

OTHER PUBLICATIONS

GITHUB, Inc. "Anonymous Zether extension paper" <https://github.com/jpmorganchase/anonymouszether/blob/master/docs/AnonZether.pdf> last retrieved on May 26, 2022 (12 pages).
(Continued)

*Primary Examiner* — Thuy N Nguyen
(74) *Attorney, Agent, or Firm* — Holland & Hart LLP

(57) ABSTRACT

A decentralized and trust-minimizing computer architecture for computing rewards for users of an advertising system includes cryptographic black box accumulators (BBA), which is a cryptographic counter that only the issuer can update. An attention application requests initialization of a BBA from a guardian and subsequently requests updates to the BBA to track interactions between a user of the attention application and ads on the attention application. The guardian signs updates to the BBA to reach agreement on the state of ad interactions. The attention application may randomize the BBA and submit requests via an anonymous channel such that no participant can link two encounters with the BBA to each other or link the BBA to a specific attention application, thus improving user privacy. Reward redemption requests can be made based on a known policy and committed to a public blockchain for verification by observers that the protocol is operating correctly.

20 Claims, 10 Drawing Sheets

Related U.S. Application Data

(60) Provisional application No. 63/017,604, filed on Apr. 29, 2020.

(51) Int. Cl.
  G06Q 30/0241 (2023.01)
  G06Q 30/0273 (2023.01)
  H04L 9/06 (2006.01)
  H04L 9/32 (2006.01)
  H04L 9/00 (2022.01)

(52) U.S. Cl.
  CPC .......... H04L 9/0618 (2013.01); H04L 9/3218 (2013.01); H04L 9/50 (2022.05); H04L 2209/42 (2013.01); H04L 2209/56 (2013.01)

(58) Field of Classification Search
  CPC . G06F 21/6227; H04L 9/0618; H04L 9/3218; H04L 9/50; H04L 2209/42; H04L 2209/56; H04L 9/3239; H04L 9/3247; H04L 63/0407; H04L 63/0428
  See application file for complete search history.

(56) References Cited

U.S. PATENT DOCUMENTS

| | | | | |
|---|---|---|---|---|
| 7,523,016 | B1* | 4/2009 | Surdulescu | H04L 63/1416 702/185 |
| 7,630,986 | B1* | 12/2009 | Herz | G06F 16/337 707/999.009 |
| 8,751,811 | B2* | 6/2014 | Meyn | H04L 9/3247 713/176 |
| 9,166,714 | B2* | 10/2015 | Barve | H04H 60/64 |
| 9,489,522 | B1* | 11/2016 | El Defrawy | H04W 4/21 705/14.66 |
| 9,794,797 | B2* | 10/2017 | Hoffberg | G06Q 30/08 |
| 9,852,306 | B2* | 12/2017 | Cash | H04L 9/0894 |
| 10,229,282 | B2* | 3/2019 | Sierra | G06F 21/6245 |
| 2003/0120598 | A1* | 6/2003 | Lam | H04L 9/0822 705/50 |
| 2003/0200140 | A1* | 10/2003 | Hars | G06Q 30/02 705/14.31 |
| 2005/0038900 | A1* | 2/2005 | Krassner | G06Q 30/02 709/231 |
| 2006/0015904 | A1* | 1/2006 | Marcus | H04N 7/16 348/E7.071 |
| 2010/0106604 | A1* | 4/2010 | Bhatia | G06Q 30/0275 705/37 |
| 2010/0317420 | A1* | 12/2010 | Hoffberg | G06Q 30/0282 463/1 |
| 2014/0108818 | A1* | 4/2014 | Choi | H04L 63/06 713/189 |
| 2014/0298038 | A1* | 10/2014 | Gauravaram | H04L 9/0643 713/189 |
| 2016/0253710 | A1* | 9/2016 | Publicover | H04W 4/21 705/14.66 |
| 2017/0024762 | A1 | 1/2017 | Swaminathan | G06Q 30/0277 |
| 2017/0091805 | A1* | 3/2017 | Tu | G06Q 30/0255 |
| 2017/0091809 | A1* | 3/2017 | Liu | G06Q 30/0246 |
| 2017/0132230 | A1* | 5/2017 | Muralidhar | G06F 16/9535 |
| 2017/0243256 | A1* | 8/2017 | Li | G06F 16/2379 |
| 2017/0323328 | A1* | 11/2017 | Nam | G06F 16/242 |
| 2018/0049043 | A1* | 2/2018 | Hoffberg | G06Q 20/065 |
| 2018/0067939 | A1* | 3/2018 | St. Thomas | G06Q 30/0255 |
| 2018/0137512 | A1* | 5/2018 | Georgiadis | H04L 63/08 |
| 2018/0268073 | A1* | 9/2018 | Wang | G06F 16/9535 |
| 2018/0276626 | A1* | 9/2018 | Laiben | G06Q 20/3829 |
| 2019/0163829 | A1* | 5/2019 | Puri | G06Q 30/02 |
| 2019/0342095 | A1* | 11/2019 | Simons | H04L 67/1097 |
| 2019/0378153 | A1* | 12/2019 | Eich | G06Q 50/01 |
| 2019/0378164 | A1* | 12/2019 | Eich | H04N 21/4784 |
| 2019/0378166 | A1* | 12/2019 | Eich | H04N 21/44204 |
| 2020/0005349 | A1* | 1/2020 | Brody | G06Q 30/0245 |
| 2020/0034874 | A1* | 1/2020 | Narayan | G06Q 30/0277 |
| 2020/0084483 | A1* | 3/2020 | Brown | H04L 9/0643 |
| 2020/0117690 | A1* | 4/2020 | Tran | G06F 16/90332 |
| 2020/0167433 | A1* | 5/2020 | Karayev | G06N 3/08 |
| 2020/0349611 | A1* | 11/2020 | Publicover | H04N 21/6582 |
| 2020/0374113 | A1* | 11/2020 | Noam | G06F 21/64 |
| 2021/0014042 | A1* | 1/2021 | Sivathanu | H04L 9/0637 |
| 2021/0035098 | A1* | 2/2021 | Long | G06Q 20/047 |
| 2021/0119785 | A1* | 4/2021 | Ben-Reuven | H04L 9/3239 |
| 2021/0165848 | A1* | 6/2021 | Sror | G06F 16/9536 |
| 2021/0256070 | A1* | 8/2021 | Tran | G06F 16/90332 |
| 2021/0272155 | A1* | 9/2021 | Izrailev | G06Q 30/0261 |
| 2022/0038436 | A1* | 2/2022 | Upadhyay | H04L 63/0428 |

OTHER PUBLICATIONS

Spilsbury Holdings Ltd, "Aztec", <https://aztec.network/index.html>, last retrieved on May 26, 2022 (8 pages).

Williamson, "The Aztec Protocol" <https://github.com/AztecProtocol/AZTEC/blob/develop/AZTEC.pdf> Dec. 4, 2018, 24 pages Version 1.0.1, Github, USA.

GITHUB, Inc. "Golang Implementation of Quorum Clients" <https://github.com/jpmorganchase/quorum>. last retrieved on May 26, 2022 (10 pages).

Monero "Monero" <https://www.getmonero.org/> last retrieved on May 26, 2022 (8 pages).

Consensys "Build On Quorum, The Complete Open Source Blockchain Platform For Business" < https://consensys.net/quorum/> last retrieved on May 26, 2022 (9 pages).

POA Network "POA Merger& Swap Notice" <https://poa.network/> Last retrieved on May 26, 2022 (1 page).

Electric Coin Company "Zcash" <https://z.cash/> Last retrieved on May 26, 2022 (3 pages).

Go-Ethereum "Clique Consensus Mechanism" <https://github.com/ethereum/go-ethereum/blob/master/consensus/clique/clique.go> Last retrieved on May 26, 2022 (24 pages).

Go-Ethereum "Ethereum Improvement Proposals 650" <https://github.com/ethereum/EIPs/issues/650> Last retrieved on May 26, 2022 (53 pages).

Bashir et al, "Tracing Information Flows Between Ad Exchanges Using Retargeted Ads" 25th USENIX Conference on Security Symposium, USENIX Association, SEC'16, pp. 481-496, Aug. 10-12, 2016, 17 pages, Austin, TX, USA.

Boneh, "Conjunctive, Subset, And Range Queries On Encrypted Data," 4th Conference on Theory of Cryptography, TCC'07, 2007, 29 pages, Berlin, Heidelberg, Germany.

Brave, "Basic Attention Token (BAT): Blockchain Based Digital Advertising," <basicattentiontoken.org>, 2017, 37 pages.

Bünz et al., "Bulletproofs: Short Proofs For Confidential Transactions And More" IEEE Symposium on Security and Privacy (SP), May 2018, 46 pages, San Francisco, CA, USA.

Bünz et al., "Towards Privacy In A Smart Contract World,". Cryptology ePrint Archive, 2019, 49 pages, <https://eprint.iacr.org/2019/191>, San Francisco, CA, USA.

Camenisch et al., "Efficient Group Signature Schemes for Large Groups (Extended Abstract)", Crypto, 1997, 15 pages.

Canny et al., "Practical Largescale Distributed Key Generation," May 2004, 15 pages, vol. 3027, Berkley, CA, USA.

Chaum et al., "Wallet Databases with Observers," 12th Annual International Cryptology Conference on Advances in Cryptology, Crypto '92, 17 pgs, London, UK, UK.

Damgård, "On σ-Protocols," Lecture Notes, University of Aarhus, Department for Computer Science, 2002, 22 pages, Aarhus, DK.

Davidson et al., "Privacy Pass: Bypassing Internet Challenges Anonymously," Proceedings on Privacy Enhancing Technologies, 2018, 17 pages, Barcelona, SP.

Elgamel, "A Public Key Cryptosystem And A Signature Scheme Based On Discrete Logarithms," IEEE Transactions on Information Theory, Jul. 1985, 9 pages.

Fiat et al., "How to Prove Yourself: Practical Solutions to Identification and Signature Problems," Crypto, 1986, 9 pages.

Gennaro et al., "Secure Distributed Key Generation For Discrete-Log Based Cryptosystems," Journal of Cryptology, 20(Jan. 1, 2007, 16 pages.

(56) References Cited

OTHER PUBLICATIONS

Goldberg et al., "Verifiable Random Functions (VRFs)" Boston University Library, Internet Engineering Task Force, Aug. 2019.24 pages, Boston, MA, USA.

Goldwasser et al., "The Knowledge Complexity of Interactive Proof-Systems," STOC, 1985. 14 pages.

Kannengiesser et al., "Bridges Between Islands: Cross-Chain Technology For Distributed Ledger Technology," 53rd Hawaii International Conference on System Sciences, Jan. 2020, 11 pages, Hawaii, USA.

Kshetri, "The Economics Of Click Fraud". IEEE Security Privacy Magazine, 8(3), May 2010, 12 pages, Greensboro, NC, USA.

Kumari et al., "Demystifying Ad Fraud,". IEEE Frontiers in Education Conference (FIE), Oct. 2017, 5 pages, Indianapolis, IN, USA.

Lu et al., "BARS: A Blockchain-Based Anonymous Reputation System For Trust Management In Vanets," Cornell University, CoRR, 2018, 6 pages, Ithaca, NY, USA.

Micali et al., "Verifiable Random Functions," 40th Annual Symposium on Foundations of Computer Science (Cat. No. 99CB37039), 1999, 11 pages.

Nakamoto et al., "Bitcoin: A peer-to-peer electronic cash system," ,bitcoin.org>, 2008, 9 pages.

Papadopoulos et al., "Cookie synchronization: Everything You Always Wanted To Know But Were Afraid To Ask," World Wide Web Conference, WWW, May 13-17, 2019, 11 pages, San Francisco, CA, USA.

Saltini, "Correctness Analysis Of IBFT," Cornell University, CoRR, abs/1901.07160, 2019, 31 pages, Ithaca, NY, USA.

Sasson et al., "Zerocash: Decentralized Anonymous Payments From Bitcoin,". IEEE Symposium on Security and Privacy, May 2014, 16 pages, San Jose, CA, USA.

Schaub et al., "A Trustless Privacy Preserving Reputation System," ICT Systems Security and Privacy Protection, 2016, Springer International Publishing, 25 pages, Villeurbanne, FR.

Schindler et al . . . "Distributed Key Generation with Ethereum Smart Contracts," 2018, 13 pages, Wien, AT.

Speicher et al., "Potential for Discrimination in Online Targeted Advertising,". FAT 2018—Conference on Fairness, Accountability, and Transparency, vol. 81, Feb. 2018, 15 pages, New York, NY, USA.

Venkatadri et al., "Privacy Risks With Facebook's Pii-Based Targeting: Auditing A Data Broker's Advertising Interface," IEEE Symposium on Security and Privacy (SP), May 2018, San Francisco, CA, USA.

Vizier et al., "Comchain: Bridging The Gap Between Public And Consortium Blockchains," IEEE International Conference on Internet of Things (iThings) and IEEE Green Computing and Communications (GreenCom) and IEEE Cyber, Physical and Social Computing (CPSCom) and IEEE Smart Data (SmartData), Jul. 2018, 7 pages, Halifax, NS, CA.

Wood et al., "Ethereum: A Secure Decentralised Generalised Transaction Ledger," Ethereum project yellow paper, 151(2014), 2014, 32 pages.

PEGASYS, "Ethereum for the Enterprise", < https://web.archive.org/web/20190704170507/https://pegasys.tech/>, last retrieved on May 31, 2022 (8 pages).

* cited by examiner

DECENTRALIZED PRIVACY-PRESERVING REWARDS WITH CRYPTOGRAPHIC BLACK BOX ACCUMULATORS

CROSS-REFERENCE TO RELATED APPLICATIONS

The present Application for Patent is a continuation of U.S. patent application Ser. No. 17/244,923, entitled "Decentralized Privacy-Preserving Online Advertising" filed on Apr. 29, 2023, which claims priority benefit of U.S. Provisional Patent Application No. 63/017,604, entitled "Decentralized Privacy-Preserving Online Advertising" filed on Apr. 29, 2020; each of which is expressly incorporated by reference herein.

TECHNICAL FIELD

The present disclosure relates to cryptographic communications in an advertising rewards system.

BACKGROUND OF THE INVENTION

Producers of content on the World Wide Web depend mostly on advertising to fund their activities. This arrangement suffers from broken economic incentives in several ways. Existing web advertising involves classifying a user in the cloud, thus exposing a raft of sensitive information about the user, usually based on web trackers that follow the user all over the Web. Ads are then served to the user embedded in the content based on the matching.

The status quo involves rampant fraud, exploitation of the user's privacy, often abusive ad behavior (e.g., use of video, audio, consumption of screen space, tracking, etc.). Markets for buying and selling digital advertising on the web are manipulated, diverting value from content producers and publishers and consumers to rent-seeking ad tech firms. Most of the revenue in the current system goes to ad tech companies, not content producers, and users are not compensated for their attention paid to the ads. An increasing number of users are blocking ads and web trackers completely to defend against the abuse, but this costs publishers and content producers ad revenue and does not fairly economically support content producers.

Attempts have been made, all of which suffer from certain drawbacks, to compensate users in various ways for attention paid to ads on the Web. The prior attempts have all involved compromises in the areas of privacy and dependence on the continued existence and honesty of centralized actors. Prior attempts have been susceptible to fraud that could be very hard or impossible to detect by the participants, let alone independent verifiers.

Accordingly, there is a need for a new type of computer architecture, with a trustless and decentralized framework for matching users to advertisements on the Web in a fair and privacy-respecting way that shares advertising revenue between content producers and ad viewers instead of middleman ad tech companies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
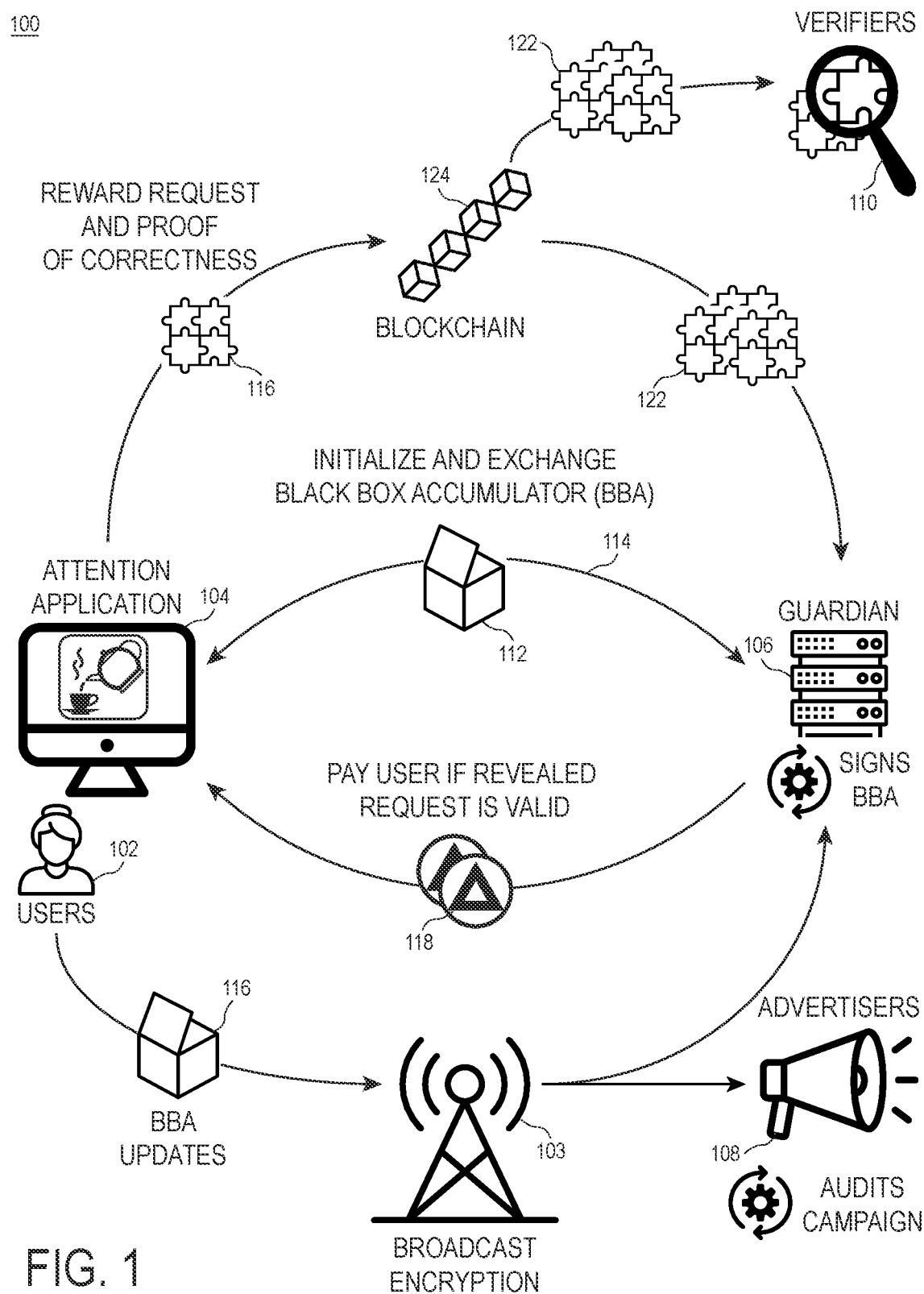
FIG. 1 is a diagram of a computer system architecture including users of attention applications, a guardian computing terminal, Web advertisers, and independent reward verification components in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

It should be understood that, for purposes of this disclosure, the terms "ad" and "advertising" are used interchangeably. Reference is also made to an "attention application" or "attentional application terminal" on which an end user can view ads embedded in media content from publishers or content creators. The term "attention application" is applied in this disclosure with reference to a web browser displaying content from the World Wide Web to the user, but should also be understood to cover other types of applications that can run on hardware and display media content to a user, such as e-readers, gaming platforms, smartphones, virtual reality systems, augmented reality systems, audiobook, music, and podcast play back systems, etc.

It has been desired to have a mechanism on the World Wide Web whereby the existing arrangement of online advertising can be avoided. The status quo has developed serious drawbacks including degradation of end user privacy and transparency to advertisers regarding the cost and performance of their advertising campaigns. Typical Web browsing involves heavy exposure to so-called web trackers that follow users around the Web, mining their activities and reporting sensitive and private user information (e.g., browsing history, search logs, purchase histories, map logs, etc.) to unaccountable ad network operators who assemble and sell detailed demographic and consumer profiles of the user. This results in heavily targeted advertising that may be distasteful to the user based on information the user may have preferred to remain private.

On the advertiser side of the status quo, the market for placing ads may be heavily manipulated by malicious ad network actors (e.g., manipulating prices for ads) and reliable feedback on the performance of an ad campaign may be distorted to present a picture of the campaign's effectiveness that is untrue. Advertisers receive fraudulent analytics on their ad campaigns, content producers receive scraps from the ad revenue stream, and users' privacy is infringed, and users are left in the cold in terms of fair compensation for their attention.

Under existing systems, it is increasingly common for users to turn to ad blockers and tracker blockers, which have partially succeeded in protecting the end user's privacy, but blocking ads entirely deprives the publishers and content creators of revenue on which they depend. There are reward system alternatives to total ad blocking that aim to benefit users, content creators, and advertisers, but these systems all rely on a trusted guardian or intermediary on which the system depends. There is often no way for users or observers to determine whether the guardian is acting honestly with respect to reward payouts or ad campaign analytics.

One example of a rewards system is Brave Rewards included in the Brave Browser published by Brave Software, Inc. Under Brave Rewards, ad catalogs can be pushed to the browser whereafter users match with ads locally, using only portions of the user profiles deemed allowable by the users themselves. For example, a user can decline to allow access to a web search query log or browsing history for purposes of ad matching. The ads can be shown to users in a toast message or embedded in media content (e.g., embedded in text of a web page). Only well-behaved ads are included in the catalog, meaning no ads that attempt abusive or irritating behavior (e.g., change window focus, play audio, video, false close button, etc.).

With Brave Rewards, advertisers can purchase ad space in the catalogs with a blockchain token called the Basic Attention Token (BAT) that is paid to users (e.g., on a month-end basis) depending on their interactions with the ads as measured by the Brave Browser. The Brave Browser publisher is the guardian in this system and receives the BATs and holds them until users request rewards payments, which may occur on a periodic basis, such as monthly. Depending on the amount and quality of ad-interactions, and depending on the rewards paid by advertisers, Brave Rewards users are due a payout of BATs, which may be made from the Brave Rewards guardian to users at a cryptocurrency wallet in the browser itself or to a third-party custodial wallet. Rewards described herein need not be in the form of BATs: the rewards could include any type of blockchain token or another type of reward.

In a system like Brave Rewards, one aspect of the trust involves trusting the guardian accurately compute rewards owed to users. Users have no way to independently compute rewards and verify they have actually been paid what is owed. Confidence in the fairness of the system falls to the trustworthiness of the centralized guardian entity and likely will never be high if the rewards cannot be audited by outsiders who do not have any special access to the system.

It is likely desired by rewards network participants and advertisers for the system to be privacy-respecting and trustless such that users need not worry whether the guardian is honest or whether they are compromising privacy by participating in the rewards payouts. Likely a completely decentralized rewards system with no third-party guardian is not practical. Instead of eliminating the guardian completely, the architecture of the present disclosure retains a guardian but structures the advertising campaigns and rewards payouts in accordance with several design goals that permit verification of the honesty of the system while still respecting the user's privacy.

Disclosed herein is a new decentralized computer architecture that includes a novel cryptographic proof that solves problems associated with prior rewards systems. In the prior systems, users had to reveal too much private information regarding their ad interactions and had to trust that the centralized entity or guardian was being honest with rewards payouts. Advertisers also had to trust the centralized guardian was giving accurate measurements of the performance of ads and was spending the ad budget in accordance with the advertiser's instructions. The system of the present disclosure avoids these problems with a novel use of a cryptographic mechanism called a black box accumulator (BBA) in connection with the decentralized architecture. For purposes of this disclosure, a BBA may also be referred to as a BBA token or a BBA identifier because it is simply a string of cryptographic material. Under the disclosed system, users can have a high confidence that the rewards paid out are what was actually owed. Advertisers can independently verify the proofs to have a high degree of confidence that their ad campaigns are being attacked by fraud. Outside observers can also verify the cryptographic proofs to audit the system and verify the protocol is operating correctly. In implementations, the proofs can be stored and/or verified on a blockchain, which would provide a trustless verification that observers can simply read off the blockchain public ledger. In other implementations, the reward payment itself can be made on the blockchain, thus providing a complete set of information needed to verify the protocol.

The present decentralized architecture includes several design goals to accomplish the aforementioned objectives. One design goal is supporting reward computation based on user ad interactions and reward verification without leaking information about user ad information behavior. Users can independently calculate their rewards and prove computational correctness thereof without disclosing specifically which ads with which they have interacted.

Another design goal is allowing all participants and observers to verify that the reward requests are correctly computed, and thus confirm that the protocol is running correctly and improve confidence in the fairness of the system. A final design goal is for advertisers to be able to verify that the rewards claimed by users are correctly computed based on true ad interactions. When these goals are met, participants can have reliable evidence that they need not trust the centralized guardian to be honest, which is an improvement over existing rewards systems in terms of fairness, privacy, and reliability.

Meeting these goals is important to the safety, privacy, and security of users of the present architecture. It is of the highest importance that attackers not be able to decipher an intercept of the BBA or rewards requests because, if they could do so, it would represent a breach of privacy and undermine confidence in the system. The current state of Web advertising relies on trust and users constantly endure breaches of that trust when their personal profiles, browsing history, query history, location history, and more are exposed to ad tech companies who mine, sell, package, and resell the information for all it is worth. If users are to be expected to let down their ad blockers and participate in an advertising and rewards system, they must have confidence that no attacker will be able to peer into the system and mine the personal content found therein. Moreover, the users and advertisers must have confidence that the rewards protocol is operating correctly, and that users are not being shortchanged when rewards are owed; and advertisers are not being defrauded when the protocol says a real user truly interacted with their ad.

To meet the above-referenced goals, the computer architecture described herein solves several problems that have been present in prior ad reward systems. One problem is linkability on the level of the ad interaction. If a specific ad interaction can be linked to a specific user, then it would reveal information about the user that the user may wish to keep private. It may seem that a single ad interaction does not reveal much about a particular user, but if participants in the system are able to track all ad interactions by a single user, then a picture of the user emerges that can eventually become quite detailed, as is common for users who regularly browse the Web. The architecture disclosed herein, on the other hand, protects against linkability ad interaction-level linkability.

The next problem solved in the present architecture is linkability between any two ad interactions. If it is known that two ad interactions were performed by the same user, even if the identity of the user is not known, then a profiling opportunity, which would infringe the user's privacy exists. In the present architecture, two ad interactions can neither be linked by the campaign facilitator nor the advertisers. Only the user who made both ad interactions herself could make the linkage.

Another problem solved by the current architecture is an issue of advertiser campaign analytics privacy. When an advertiser participates in the system, it is presumable that the advertiser wishes to collect advertising metrics to evaluate whether the cost of placing the ads is worth it. If these advertising metrics are available to outsiders, then it could represent the leakage of valuable commercial information or information of another character that could compromise the advertiser. Accordingly, only the campaign facilitator and the advertiser have visibility into the performance of an advertising campaign.

Next is the concept of interaction state update verifiability. By this it is meant that a user can verify that a current state of its ad interactions is correctly recognized and recorded by the guardian to reflect new ad interactions after they occur. Next, the present architecture has decentralized reward request verifiability, meaning any participant or observer can verify that rewards requests from users are valid with respect to the state of the interactions as accepted by the guardian. The result of the reward verification may be committed to a public blockchain for visibility purposes.

FIG. 1 is a diagram of a computer system architecture 100 including users 102 of attention applications 104, a guardian terminal 106 (also referred to herein as an ad campaign facilitator or a facilitator or a guardian component), Web advertisers 108, and independent reward verification components 110 in accordance with some embodiments. The computer system architecture 100 includes a concept known as a black box accumulator (BBA) 112. A BBA is a type of signed and tamper-proof cryptographic token that functions like a counter and permits users to collect and sum up values in a privacy-preserving manner. In the present architecture 100, the BBA encodes an ad interaction vector, which is a vector wherein each index corresponds to an ad in the ad catalog. Incrementing an index in the ad interaction vector represents an ad interaction between the user 102 and the ad corresponding to the incremented index. Since a BBA can only be updated by its creator, the attention application terminal 104 and the guardian terminal 106 will pass the BBA 112 back and forth to execute updates thereto. The attention application terminal 104 will request to increment the counter based on ad interactions and the guardian terminal 106 signs updates to the BBA 112 if the requests are deemed to be valid. In this way, the attention application 104 and the guardian terminal 106 can mutually agree on the number of, and validity of, ad interactions by the user 102 on a rolling basis as the ad interactions occur.

An important characteristic of BBAs is that issuers are not able to later link encounters with a BBA to a particular user. For purposes of this disclosure, an encounter with a BBA is referred to as a "show" event. When the guardian terminal 106 encounters a BBA in a show event, there is no way for the guardian terminal 106 to link the show event to previous show events. The BBA design also defends against attackers who try to cheat the system by pretending to have collected a higher amount of ad interactions than what was authorized. The BBA design provides unlinkability, privacy, and integrity of the encoded ad interaction vector.

Figure 4:
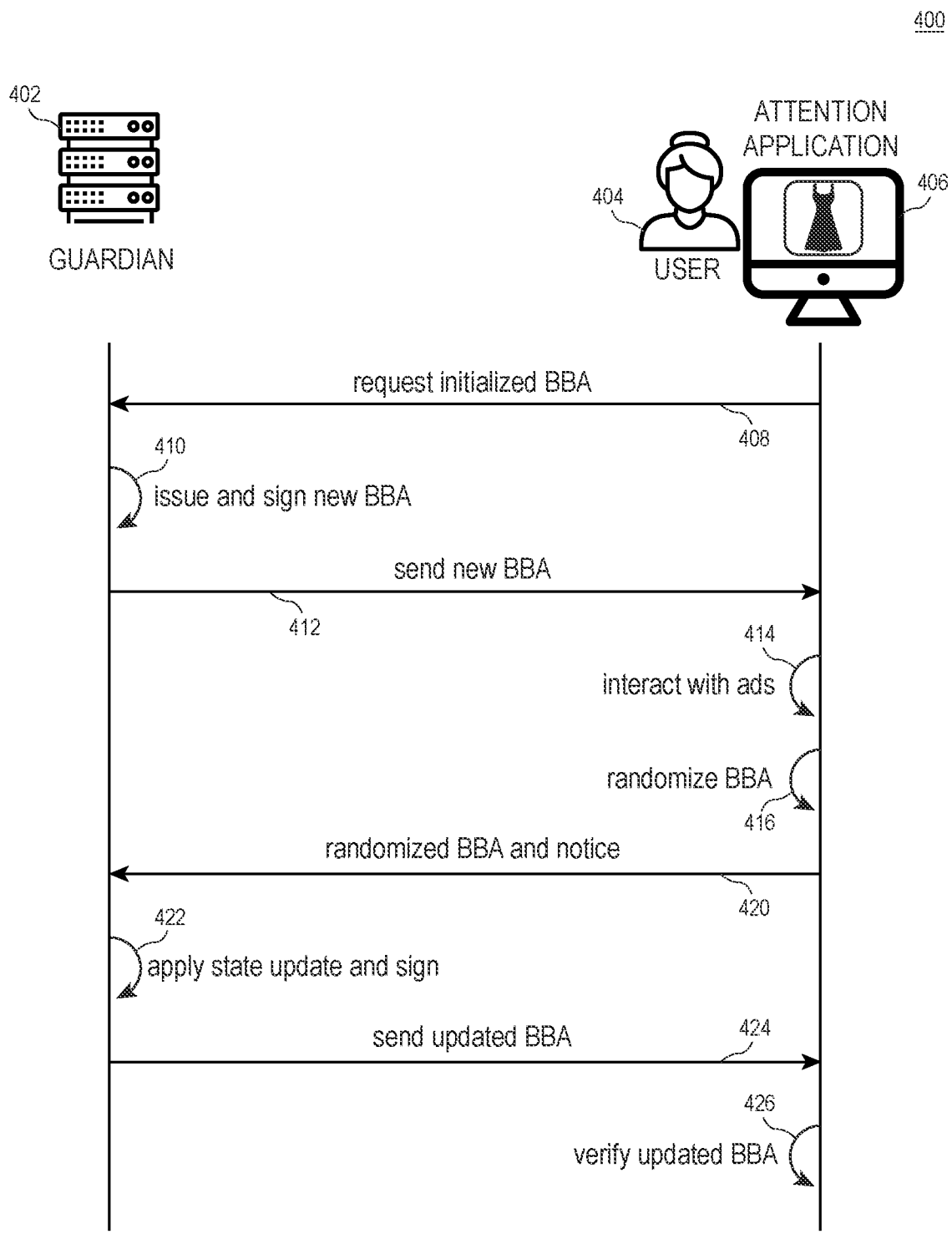
FIG. 4 is a signal diagram of an example exchange of a black box accumulator (BBA) between a guardian computing terminal and a user of an attention application terminal in accordance with some embodiments.
Figure 5:
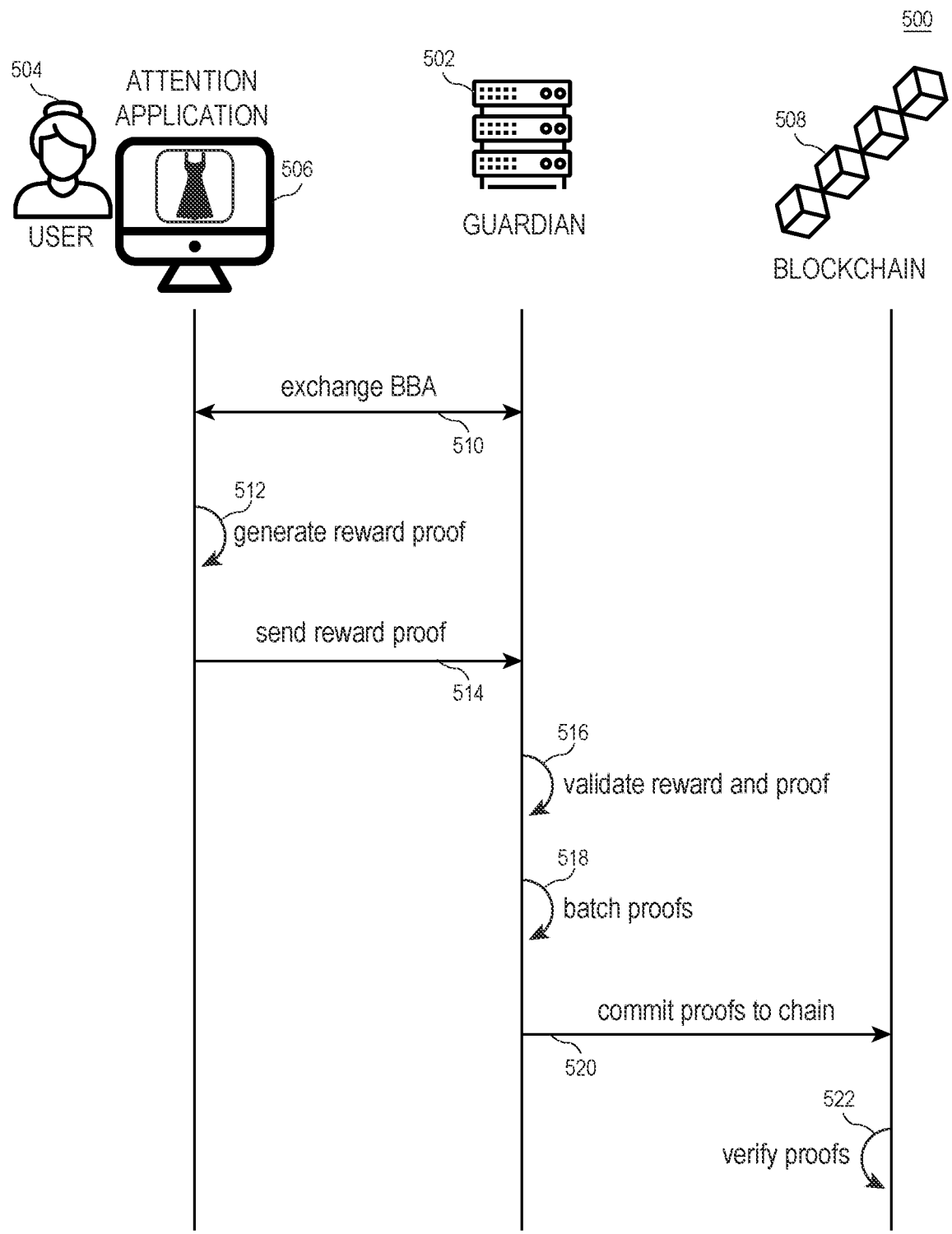
FIG. 5 is a signal diagram of an example generation of a reward proof by a user of an attention application terminal based on the exchange of a BBA and committing the reward proof to a blockchain for the independent reward verification components in accordance with some embodiments.

The workflow described herein can be divided into five phases: 1) initialization of the interaction state: 2) update of the interaction state: 3) reward calculation: 4) reward verification; and 5) anonymous and scalable payments. These phases will be described at a high level with reference to FIG. 1: FIGS. 4 and 5 will describe the algorithms applied to the BBA in greater detail.

In the first phase of the present architecture 100, initialization of the interaction state, the attention application terminal 104 requests a newly initialized BBA 112 from the guardian terminal 106 through the channel 114. In the initialized state, the BBA 112 corresponds to zero rewards because the user 102 has not yet interacted with any reward-bearing ads on the attention application terminal 104. The channel 114 may be an anonymous channel to protect against leaking private information of the user 102 through the initialization request. After the user 102 has interacted with one or more ads on the attention application terminal 104, the attention application terminal 104 can begin the process of updating the BBA to reflect the ad interactions. Updating can be done after every ad interaction, in a batched manner after a certain number of ad interactions are in a queue, based on the elapsing of a period of time, etc. To update the BBA 112, the attention application 104 sends a copy of the BBA 112 together with a notification of which interaction(s) took place. As with the initialization request, the channel 114 through which the attention application 104 sends the BBA 112 is an anonymous channel such that the guardian terminal 106 cannot link the request to any prior requests made by the same user 102. When the guardian 106 receives the BBA and the notification of user ad interactions from the attention application terminal 104, the guardian terminal 106 updates the BBA 112 according to the interaction encoded in the request and returns it to the attention application terminal 104. The attention application terminal 104 can then verify the correctness of the update to the BBA 112.

In addition to exchanging the BBA 112 with the guardian terminal 106, the attention application terminal can broadcast the BBA 112 through the broadcast encryption channel 103. The broadcast encryption channel 103 is a many-to-many channel between the attention application terminal 104, the guardian terminal 106, and the advertisers 108. Every reward update request made by the attention application terminal 104 is encrypted and published in the broadcast encryption channel 103, over which the guardian terminal 106 and the advertisers 108 have read access. In this arrangement, the guardian terminal 106 and the advertisers are receiving updates to the BBA 112 over the same channel so that the advertisers 108 can have confidence that the guardian terminal 106 is applying the updates to the advertising campaigns of the advertiser 108 honestly.

In implementations, it may be viewed as a privacy enhancement for an advertiser 108 to only have read access to messages from its own campaign and not have read access to messages relating to the advertising campaigns of other advertisers. Rather than directly encrypting the BBA for a specific advertiser 108, the broadcast encryption channel 103 distributes keying information that allows the qualified advertiser 108 to reconstruct the content encryption key whereas revoked or unauthorized users find insufficient information to recover the key. In this arrangement, an advertiser 108 would have to collude with an unauthorized advertiser to share the key for unauthorized access to occur. In practice, this is unlikely because each advertiser 108 would be breaching its own privacy by doing so. The guardian 106 can decrypt all messages published in the broadcast channel in order to process them and update the interaction state of the user.

Since individual ad interactions are likely only associated with small rewards payments, it is likely that an attention application terminal 104 will accumulate multiple updates to the BBA 112 before it is desirable to request a rewards payout. When it is appropriate to request a rewards payout (e.g., when requested by the user 102, at the end of a monthly period, etc.), the attention application terminal 104 can compute the rewards due to the user 102 based on the latest BBA 112 received from the guardian 106. The attention application 104 can make this calculation because it is aware of how much each ad interaction should pay due to possession of an ad policy vector, described in more detail with reference to FIG. 3 and because it knows how many ad interactions the user 102 had with those ads over the relevant time period. The reward calculation is therefore a local calculation that can be carried out at the attention application terminal 104 and that does not depend on trusting any other participant in the system. Knowledge of the ad policy vector is a feature that improves over existing ad rewards systems because the users in the existing systems have no way of checking whether the reward received was accurate.

The attention application terminal 104 then generates a proof of correctness 116 of rewards owed and transmits the proof of correctness 116 together with a reward request and the signature to the guardian terminal 106. As with the exchange of the BBA 112, transmission of the proof 116 may occur through an anonymous channel such as channel 114. In implementations, transmission of the reward request and proof of correctness can be transmitted to the guardian 106 by committing the proof 116 and request to the blockchain 124. The blockchain 124 may be a public ledger to which any participant can obtain a copy on a read only basis. Committing the proofs 112 to the public blockchain 124 has several benefits. One benefit is that the blockchain 124 itself may support computation of correctness verification of the proofs 122. For example, the operation that commits the batch of proofs 122 can involve broadcasting a valid blockchain transaction that, when confirmed to the blockchain 124, invokes a smart contract, which here is meant to refer to executable code on the blockchain. The smart contract can perform the proof verification in a way that should imbue a high degree of confidence because the proof is actually checked by all nodes on a network of the blockchain and is only included in the chain if all nodes agree on the correctness of the proof. An observer in this scenario needs only check a copy of the blockchain 124 to see whether the proofs were deemed correct. In other implementations, checking the proofs 112 need not happen on-chain. Verifier components 110 are observers who may carry out the correctness determination of the proofs 122 off-chain. An advantage of transmitting the proof of correctness 116 and reward request via the blockchain 124 is that verifier components 110 can check the proof 116 and publish the results to any interested party, thus improving confidence in the correct operation of the protocol.

Even if the blockchain 124 does not include a smart contract checking the correctness of the proofs 122, the blockchain 124 will at least serve as a timestamp on the batch of proofs 122 such that the verifier components 110 and any other observers can have confidence that the proofs 122 at least existed in an unaltered state since the time of their inclusion in the blockchain 124. The verifier components 110 may have a high confidence that the proofs 112 were not altered because any attacker wishing to tamper with the proofs 122 would have to attack the entire blockchain 124 to change any information that had been previously confirmed, which may involve a computationally expensive or even impractical operation such as re-doing all the proof of work that occurred after the point in time the batch of proofs 122 was confirmed.

The guardian terminal 106 verifies the proof of correctness 116 and, if the proof 116 is acceptable, pays out the reward 118. In the example illustrated in FIG. 1, the reward 118 is the BAT blockchain token, the transfer of which is accomplished by means of a public blockchain to a wallet of the attention application 104 or via a custodial solution wherein the reward 118 is assigned to an account associated with the user 102 and/or the attention application terminal 104.

Figure 2:
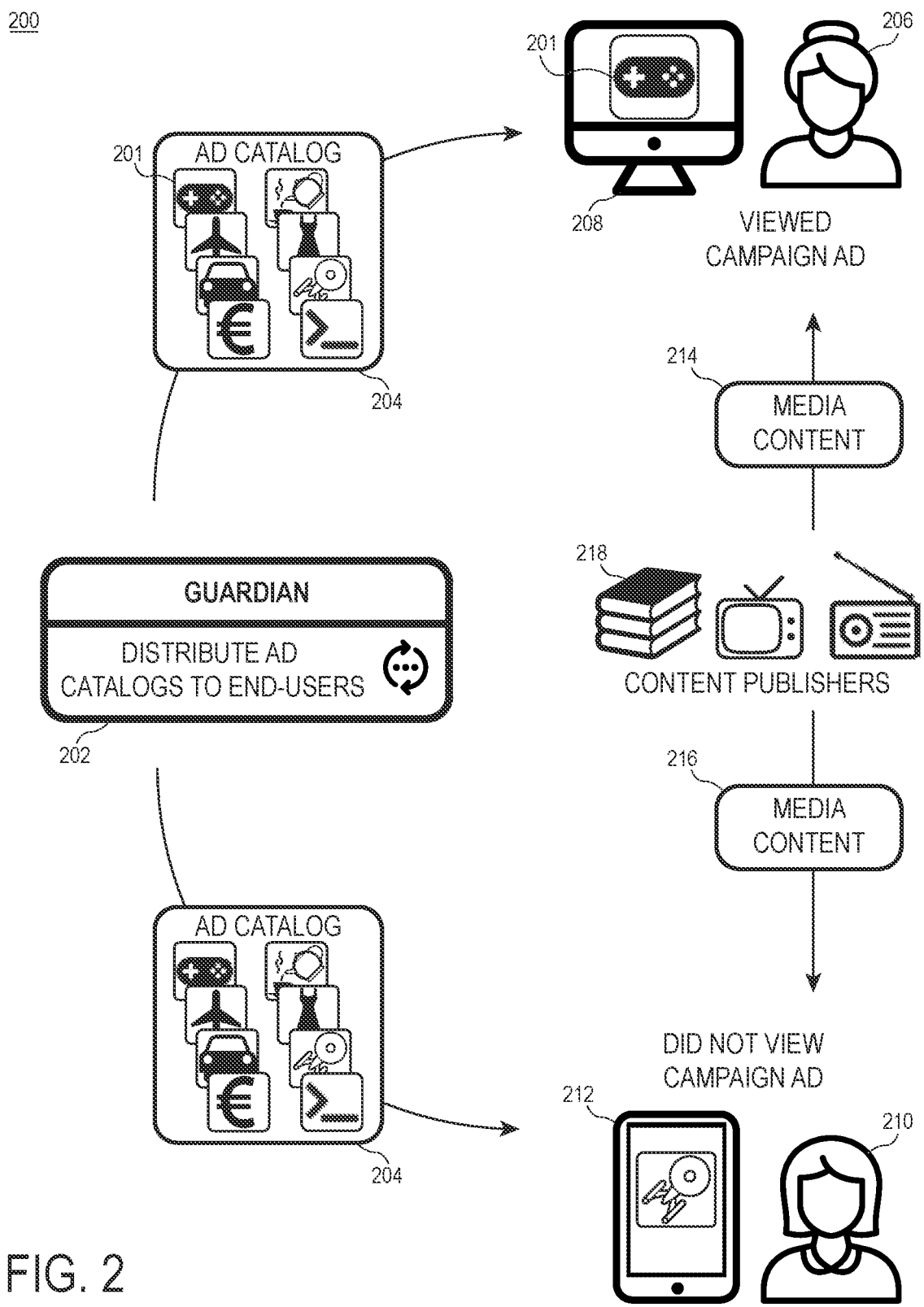
FIG. 2 is a diagram of a guardian computing terminal distributing ad catalogs including campaign ads to end users and who may view the campaign ads embedded in media content and from content publishers in accordance with some embodiments.

FIG. 2 is a diagram 200 of guardian terminal 202 distributing ad catalogs 204 including a campaign ad 201 to end users 206 and 210 who may view the campaign ad embedded in media content 214 and 216 from content publishers 218 in accordance with some embodiments. The system disclosed herein differs from existing ad networks in the way it matches ads to users. In existing systems, ad networks collect information about the users, such as by tracking them all over the web using trackers. Web trackers are usually not visible to users but keep tabs on them long after the user visits a website. Trackers report on the user to the ad network, often reporting information that the user considers sensitive personal information. Users typically are completely unaware of the tracking until an uncanny ad placement appears and the user is left to wonder how she was targeted with the ad. In such a system, the centralized ad network builds a profile of the user that can include a wide array of categorization including which market segments the user is an interested or likely consumer, the user's location, demographic information (e.g., age, gender, race, etc.), the user's income bracket, etc. Ad matching is then done by the ad network in the cloud against the user's profile and an ad is sent to the user in the context of the media content being consumed by the user.

In the present system, on the other hand, an entire ad catalog is pushed to the user and ad matching happens locally on the user's attention application, using only information about the user that the user has consented to being used in the ad matching process. Although the existing ad networks can know an unsettling degree about the user, it is unlikely that even the most intrusive tracking practices could gather as much data about the user as is available on the attention application itself (e.g., browsing history, search log, map query log, email keyword matching, etc.) Matching locally against a large ad catalog is therefore far more private and likely more accurate than existing cloud-based ad networks.

The ad catalog 204 may include the entirety of the ads available in the system 200 or the ad catalog 204 may have versions of the ad catalog, such as specific catalogs directed to a certain region only. If every user fetches the same catalog, then likely no potentially sensitive personal information will be leaked whereas a segmented catalog will reveal at least something about the user (e.g., the user lives in Asia). On the other hand, as the catalog grows larger, there are more overhead costs associated in transmitting the catalog and storing it locally at the attention application.

In the system 200, one of the functions of the guardian terminal 202 is to distribute the ad catalog(s) 204 to the example end users 206 and 210. The ad catalog 204 can include a bundle of digital advertisements with creative assets for ads that are sponsored by advertisers who have staked a reward budget in the escrow smart contract. When received by the attention applications terminals 208 and 212, ads in the catalog 204 can be matched with the respective users 206 and 210 according to the privacy permissions allowed by those users against a user profile local to the attention applications 208 and 212 against the media content 214 and 216 received from the content publishers 218.

In the example illustrated in FIG. 2, the media content 214 matched against the attention profile of the user 206 local to attention application 208 results in a match with the campaign ad 201 and the campaign ad 201 gets an impression with user 206. In other cases, such as media content 216 matched against the attention profile of the user 210 on attention application terminal 212 results in a different ad from the catalog 204 being shown to user 210. Whether the campaign ad 201 matches with a user or not, the matching process remains privacy-preserving compared to the in-the-cloud ad network matching case because the users 206 and 210 control whether and how their sensitive personal information is used for purposes of ad matching and the matching stays on the local attention application that the user controls, thus preventing the leaking of sensitive information all over the web as happens with web trackers.

Figure 3:
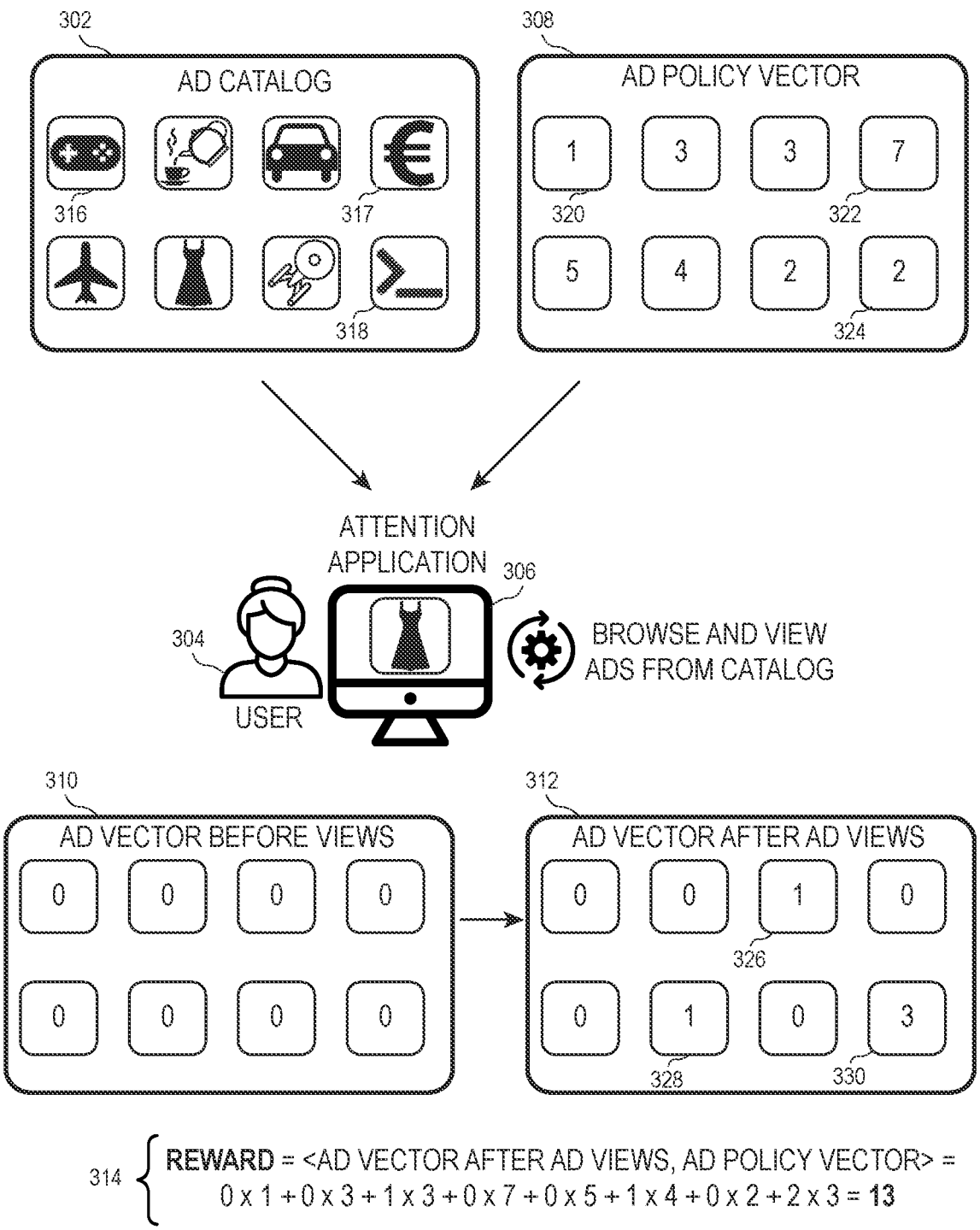
FIG. 3 is a schematic diagram of a local advertising catalog, an example ad policy vector associated therewith, an initialized ad vector before the user has paid attention to any ads, an ad vector updated to reflect actual ad interactions, and a reward calculation in accordance with some embodiments.

FIG. 3 is a schematic diagram 300 of a local advertising catalog 302, an example ad policy vector 308 associated therewith, an initialized ad vector 310 before the user has paid attention to any ads, an ad vector 312 updated to reflect actual ad interactions, and a reward calculation in accordance with some embodiments. The ad catalog 302 includes a variety of ads that can be pushed to the attention application 306 for local matching as the user 304 browses media content. The ad catalog 302 can be arranged in the form of a vector wherein each ad corresponds to one index of the vector. The example catalog 302 illustrated in FIG. 2 can therefore be viewed as an 8-tuple wherein ad 316 occupies the first index position of the vector and ad 318 occupies the last index position of the vector.

As stated above, it is a design goal of the architecture disclosed herein that the user 304 be able to compute rewards owed to be able to verify that the protocol is working correctly and as intended. To be able to do this, it is necessary to have knowledge of the ad policy vector 308. The ad policy vector 308 is a vector of the same length as the ad catalog, wherein each index in the ad policy vector 308 corresponds to the ad occupying the same position in the ad catalog vector 302. The ad policy vector 308 may be published periodically by the guardian through a privacy-preserving channel. The attention application 306 can therefore read the ad policy vector and apply it as described herein without leaking any data pertaining to the user 304.

In the example ad policy vector 308 illustrated in FIG. 3, the index 320 corresponds to the first ad in the catalog, the index 322 corresponds to the fourth ad in the catalog, and the index 324 corresponds to the last ad in the catalog. The value of each index in the ad policy vector 308 signifies the magnitude of the reward owed to the user 304 if the user 304 pays attention to the ad when browsing content on the attention application 306. The ads 316, 317, and 318 therefore are associated with ad payouts of 1 unit, 7 units, and 2 units, respectively.

The ad interaction vector 310 is illustrated in FIG. 3 in an initialized state wherein each index of the vector is a zero or null value. The state of the initialized ad interaction vector 310 corresponds to no interactions by the user 304 with ads in the catalog. The ad interaction vector would appear as illustrated in 310 before any browsing and ad interaction by the user 304 or immediately after a rewards payout.

As the user 304 browses media content and interacts with ads, the attention application 306 keeps count of the specific ads with which the user has interacted and increments the corresponding index of the ad interaction vector. The ad interaction vector 312 illustrates an example state after the user 304 has interacted with the third ad (326) once, sixth ad (328) once and eighth ad (330) three times in the catalog. The reward owed to the user 304 at any given time is computed as the scalar product between the ad interaction vector 312 and the ad policy vector 308. An example of the scalar product computation between the two vectors 308 and 312 is illustrated by the reward computation 314 wherein each corresponding index of the two vectors is multiplied and the results summed to produce the resulting reward owed.

FIG. 4 is a signal diagram of an example exchange of a black box accumulator (BBA) between a guardian terminal 402 and a user 404 of an attention application 406 in accordance with some embodiments. A BBA consists of a state, a hiding commitment of the state, and a digital signature over the commitment. The hiding commitment is a public commitment of the private state. A commitment scheme is a cryptographic primitive that allows one to commit to a chosen value, or chosen statement, while keeping it hidden to others. In the present architecture, the commitment is committing to a private ad interaction vector. The guardian 402 will sign the commitment to confirm that the new state is correct. Later, the guardian terminal 402, or any other participant, can check if the hidden state is valid by checking if the public commitment has been signed by the guardian, without learning about the values committed to.

A BBA can be randomized by the attention application terminal 406 without losing the integrity of the data structure. This is an important quality because randomization prevents any two show events (e.g., update requests, reveals of the BBA to any other party, etc.) from being linkable, which is a significant privacy improvement. Another important quality is that the state of a BBA can remain hidden during an update operation by the issuer. This means the issuer only knows the state of the BBA at the time of initialization, when the state is zero, and does not know the state after serving update requests from the attention application terminal 406. As referenced above with respect to FIG. 1, the BBA can be viewed as a counter or a tracker of the interaction state between the user 404 and the ads to which the user 404 has paid attention on the attention application terminal 406 over a period of time. The interaction state is encoded as a vector, as described in more detail with reference to FIG. 3, wherein each index of the vector represents how many valid interactions the user had with a particular ad. An initialized ad interaction vector for a catalog on N ads would appear with all zero indices as follows:

int_state=[int_ad$_0$, int_ad$_1$, int_ad$_2$, . . . , int_ad$_N$]=[0, 0, 0, . . . 0]

Later, after the user 402 has completed interactions with several ads, for example if the user 402 interacted with ad$_0$ once, ad$_2$ twice, and ad$_N$ four times, the ad interaction vector would appear as:

int_state=[1, 2, 0, . . . 4]

As referenced above, the BBA can be viewed as a private counter that only the issuer can update. If the guardian terminal 402 is the issuer of the BBA, then only the guardian 402 is able to perform updates to the state of the BBA. Accordingly, the BBA can only accumulate state updates that the guardian component 402 has deemed to be valid. As the attention application 406 detects ad interactions with the user 404, the attention application can periodically transmit the BBA back to the guardian component 402 with a notice requesting an update to the ad interaction vector. Likely, the guardian component 402 will apply a fraud detection check to prevent attacks from a dishonest attention application terminal 406. For example, the guardian 402 may rate limit the attention application terminal 406 if it claims too many ad interactions in a limited time period or the guardian 402 can track known suspicious attention applications based on the wallet or other fingerprint unique to the attention application 406.

The "ping pong" mechanism illustrated in FIG. 4 thus tracks ad interactions by the user 404 such that the guardian component 402 and the user 404 both agree as to the current state of interactions at any given point in time. In this arrangement, the BBA is linked to the attention application terminal 406 (e.g., to a cryptocurrency wallet of the attention application) during issuance and redemption. This linkage preserves the property that rewards based on the BBA can only be redeemed by the owner of the attention application 406 to which the BBA was issued. This arrangement also facilitates the decentralized and trustless computation of the reward.

Before explaining the BBA procedure illustrated in FIG. 4 in detail, we adopt some terminology and notation. In this disclosure, $\lambda$ denotes a security parameter. We write \$/←A to denote that a is chosen at random from the set A. Vector notation is in bold italic such that $c_1, \ldots C_N \in \mathbb{Z}_p^N$ is represented by c. If $G_1$, $G_2$, and $G_T$ are cyclic groups, using multiplicative notation, of prime order p, and P and P̂ are generators of $G_1$ and $G_2$, respectively, then e: $G_1 \times G_2 \rightarrow G_T$ is a bilinear map or pairing if it is efficiently computable and the following holds:

Bilinearity: $e(P^a, \hat{P}^b)=e(P, \hat{P})^{ab}=e(P^b, \hat{P}^a) \forall a, b \in \mathbb{Z}_p$.

Non-degeneracy: $e(P, \hat{P}) \neq 1_{G_T}$, i.e., $e(P, \hat{P})$ generates $G_T$. Camenish-Stadler notation is used herein to denote zero-knowledge proofs such that $$\Pi = SPK\{(x): A = g^x \wedge B = A^x\}$$

denotes the non-interactive signature proof of knowledge that the prover knows the discrete log of A and B with bases g and A, respectively, and that the discrete log is equal in both cases. We use $\Pi$. Verify to denote the verification procedure of the proof. The input of the verifier is implicit in the proof definition. The Verify function outputs $\perp$ and T for failure and success, respectively.

Some constructions of BBAs require the user to provide a zero-knowledge proof of ownership of a valid token or certificate. The architecture of the present disclosure avoids a zero-knowledge proof in the show procedure by using structure-preserving signatures over equivalence classes, termed herein SPS-EQ. An SPS-EQ takes a tuple (h, g) of group elements, and signs it. The signature can be adapted to all elements of the equivalence class, denoted by [(h, g)], which consist of all exponentiations of the pair, mainly ($h^c$, $g^c$) for any $c \in Zp$. When adapting a signature to a different element of the equivalence class, the owner of the signature is making both instantiations unlinkable. In other words, the owner is randomizing the tuple and the signature.

In the architecture of the present disclosure, an attention application terminal 406 holds an SPS-EQ signature, termed $\sigma$, over a vector (C, P), which is a commitment of their state, or in other words, the number of times the user 404 has interacted with each ad. For the structure of the commitment, this disclosure follows the ideas of algebraic MACs, PS-signatures, or CL-signatures, of encoding the various counters in the exponent.

Each BBA has a single identifier, which is spent at the time of reward redemption. The BBA contains randomness chosen by the attention application terminal 406 to preserve privacy of the requests. The attention application terminal 406 owns the committed state, the BBA identifier, and the randomness used in the token, producing the formula $$\tau = (C, P) = (h_1^{id} \cdot h_2^r \cdot \tilde{h}_1^{c_1} \ldots \tilde{h}_N^{c_N}, P)$$

where id is the identifier of the BBA, r is the randomization introduced by the attention application 406, and $c_1, \ldots, c_N$ are the various counters. The secret key of the guardian terminal 402 is an N+2 tuple of scalars $$sk = (sk_1, sk_2, sk_{c,1}, \ldots, sk_{c,N}) \in \mathbb{Z}_p^{N+2} \text{ such that}$$

$$h_1 = P^{sk_1}, h_2 = P^{sk_2} \text{ and } \tilde{h}_i^{c_i} = P^{sk_{c,i}} \text{ for } i \in \{1, \ldots, N\}.$$

The guardian terminal 402 also owns a public-private SPS-EQ key pair.

Turning now to the signal diagram of FIG. 4, the attention application 406 requests issuance of a new BBA at operation 408. The request may be based on the initialization of a new attention application terminal 406 that did not previously have a BBA, the restarting of a rewards cycle after a prior BBA was redeemed, etc. The request operation 408 includes a request for a signature over the tuple $\tau=(C^k, p^k)= ((h_1^{id} \cdot h_2^r)^k, P^k)$ where $$k \xleftarrow{\$} Z_p$$

is the randomness used during issuance. As part of request operation 408, the attention application 406 provides a proof that the request is correct.

Upon receipt of the request 408, the guardian terminal 402 runs operation 410 to issue and sign the new BBA. Operation 410 includes verifying the proof provided in the request operation 408 from the attention application terminal 406. If the verification check is successful, then operation 410 involves producing an SPS-EQ over the pair σ to yield a new signed BBA. At operation 412, the guardian 402 sends the new signed BBA, and the attention application terminal 406 stores the BBA, the signature σ, and the randomization used during the request R=k.

Next, the attention application terminal 406 presents media content to the user 404 with ads in operation 414. The attention application builds an ad interaction counter as the user 404 interacts with ads on the attention application terminal 406. The ad interaction counter is used because the attention application terminal 406 cannot update the BBA itself: only the issuer of the BBA, the guardian terminal 402 can update the BBA. The ad interaction counter is used to create a notice requesting an update that can be sent to the guardian component 402 with which the guardian terminal 402 can update and sign a new BBA. The ad interaction counter may simply be a vector with a length N (where there are N ads in the catalog) where each index of the vector corresponds to the number of times the user 404 viewed the corresponding ad. After receiving a reward, the ad interaction counter may be "zeroed out," meaning the attention application 406 resets its list of ad interactions for which a reward is pending to zero.

When the attention application terminal 406 is ready (e.g., when the user 404 requests it, when a time period has elapsed, when a minimum number of rewards are owed, etc.), the attention application randomizes the BBA at operation 416. The randomization operation 416 is possible because of reliance on the SPS-EQ. In particular, the attention application randomizes the BBA at operation 416 by computing $\tau'=(\tau_1^{k'}, \tau_2^{k'})$, where k' is chosen uniformly at random from $\mathbb{Z}^*_p$.

Next, the attention application terminal 406 at operation 420 sends t' and the signature σ', adapted to the new randomized representation. Letting ad j be the one informed during the event, upon receipt, the guardian 402 parses $\tau'=(\tau_1', \tau_2')$ and verifies the validity of the signature σ'. At operation 422, the guardian terminal 402 applies the requested state update to the BBA, if the request is deemed valid, and signs the BBA by letting $$C_U = \tau_1' \cdot (\tau_2')^{sk_{c,j}}$$

and producing an SPS-EQ over the new tuple $(C_U, \tau_2')$. The guardian updates the BBA and signs the new state to produce a new commitment. The signature is of type SPS-EQ so that the user can randomize it and the guardian terminal 402 cannot track and link the signatures across interactions and users. The guardian 402 then sends the new BBA state and the new signature, created using the SPS-EQ scheme, to the attention application at operation 424. Upon receipt, the attention application terminal 406 updates the stored randomization at the verification operation 426 by multiplying it with the randomness used in the request $R_{New} = R \cdot k'$. Then verification operation 426 verifies that the update is correct with respect to the notified event. The notified event in this context is the ad interaction. The attention application checks if the BBA was correctly updated at 426 since the guardian could return the BBA without the update or with an incorrect update. The attention application 406 is now in possession of an updated BBA reflecting the current state of interactions of the user 404 with ads on the attention application 406.

FIG. 5 is a signal diagram 500 of an example generation of a reward proof by a user 504 of an attention application 506 based on the exchange of a BBA with a guardian 502 and committing the reward proof to a blockchain 508 for the independent reward verification in accordance with some embodiments. At 510, the attention application 506 and the guardian 502 exchange a BBA initialized by the guardian terminal 502 and updated according to requests by the attention application terminal 506 as described by FIG. 4. The exchange of the BBA continues until enough rewards have accumulated for the user 504 to request payout of the reward. The reward payout can be triggered by an on-demand request of the user 504, on a regular schedule, when the BBA has accumulated a threshold amount, etc. A clarification should be made concerning terminology and notation regarding the BBA during the exchange process 510. A BBA may be referred to as a BBA tuple $\tau=(C^k, P^k)= ((h_1^{id} \cdot h_2^r)^k, P^k)$, where $$k \xleftarrow{\$} Z_p$$

is a source of randomness (R=k). After the randomization process by the attention application 306, the randomized BBA tuple may be referred to as $\tau'=(\tau_1^{k'}, \tau_2^{k'})$ where k' is chosen uniformly at random from $Z_p^*$. After the attention application 506 receives the signed BBA updated based on the notification request (because only the issuer may update a BBA), it may be referred to as the "new" BBA tuple $(C_U, \tau_2')$ where $C_U = \tau_1' \cdot (\tau_2')^{sk_{c,j}}$. This could lead to confusion because of the lack of clear notation for the "new" BBA, for the next iteration of the updating process between the attention application terminal 506 and the guardian component 502. It may not be practical to continue adding prime notation to the new or updated BBA tuple τ as it is updated. This disclosure may therefore refer to the BBA tuple as the "new" or "next" BBA tuple after it has been updated by the guardian component 502 and continue to use the t notation.

One of the design principles of the current architecture is that any reward payouts must be accompanied by a proof of correctness, that will be made public, such that the various participants can have confidence that the system is operating correctly. Operation 512 is the operation by which the attention application terminal 506 generates such a proof. To understand the structure of the proof generated in operation 512 a more detailed examination of the SPS-EQ signature scheme is desirable. The SPS-EQ signature scheme is described by the following five algorithms:

(1) BGGen($1^\lambda$): on input of a security parameter $1^\lambda$, output a bilinear-group description $$BG \xleftarrow{\$} BGGen(1^\lambda).$$

(2) KeyGen(BG): on input of a bilinear-group description, chose $$(x_i)_{i \in [2]} \xleftarrow{\$} (\mathbb{Z}_p^*)^2,$$

set secret key sk=$(x_i)_{i \in [2]}$, compute public key pk←$(X_i)_{i \in [2]}$=example $(\hat{P}^{x_i})_{i \in [2]}$ and output (sk, pk).

(3) Sign(M, sk): on input of a representative M=($M_1$, $M_2$)∈$(G_1^*)^2$ of equivalence class [M], and a secret key sk=(x1,x2), chose $$y \xleftarrow{\$} \mathbb{Z}_p^*$$

and output σ←(Z, Y, Ŷ) with $$Z \leftarrow \left(\prod_{i \in (2)} M_i^{x_i}\right)^y$$

$$Y \leftarrow P^{\frac{1}{y}}$$

$$\hat{Y} \leftarrow \hat{P}^{\frac{1}{y}}.$$

(4) Verify(M, σ, pk): On input of a representative M=($M_1$, $M_2$)∈$(G_1^*)^2$ of equivalence class [M], a signature σ=(Z, Y, Ŷ)∈ $G_1 \times G_1^* \times G_2^*$; and a public key pk=$(\hat{X}_i)_{i \in [2]} \in (G_2^*)^2$, check whether $$\prod_{i \in (2)} e(M_i, \hat{X}_i) = e(Z, \hat{Y}) \wedge e(Y, \hat{P}) = e(P, \hat{Y})$$

holds. Output 1 if it holds; output 0 if it does not hold.

(5) ChgRep(M, σ, f, pk): on input of a representative M=($M_1$, $M_2$)=$(G_1^*)^2$ of equivalence class [M], a signature σ=(Z, Y, Ŷ)∈ $G_1 \times G_1^* \times G_2^*$, the randomness f∈ $\mathbb{Z}_p^*$ and a public key pk, return ⊥ if Verify (M, σ, pk)=0. Otherwise pick $$\psi \xleftarrow{\$} \mathbb{Z}_p^* \text{ and return} (M^f, \sigma') \text{ with } \sigma' \leftarrow \left(Z^{\psi f}, Y^{\frac{1}{\psi}}, \hat{Y}^{\frac{1}{\psi}}\right).$$

Based on the above algorithms for SPS-EQ signatures and their verification function, the attention application 506 can perform the provable computation of the reward. For the purposes of this explanation, it will be assumed that the user 504 has interacted with ads on the attention application 506 and thus the notice of ad interaction is not null. It is also assumed that the ad policy vector, p∈ $\mathbb{Z}_p^N$ is publicly available or at least known to the attention application 506. The ad policy vector and the ad interaction vector are described in more detail herein with reference to FIG. 3. Let the BBA and signature owned by the attention application 506 be represented by: τ=($\tau_1,\tau_2$)=$(C^R,P^R)$=

$((h_1^{id} \cdot h_2^r \cdot \tilde{h}_1^{c_1} \ldots \tilde{h}_N^{c_N})^R, P^R)$ σ=(Z, Y, Ŷ) with c∈ $\mathbb{Z}_p^N$; and R the randomization stored throughout the protocol.

Operation 512 includes de-randomization of the BBA and adapting the signature to the new representation by computing ChgRep(M, σ, f, pk). Next, the attention application 506 discloses the identifier of the BBA, computes the inner product between the counter vector (also referred to as the ad state vector) and the ad policy vector, prove that the addition of all counters does not exceed a limit (L) set by the guardian 502 for anti-fraud purposes, and generate a zero-knowledge proof of correctness. Letting Res=<c, p>, the attention application 502 generates the following proof:

$$\prod = SPK\left\{(r, c_1, \ldots, c_N) : C = h_1^{id} \cdot h_2^r \cdot \tilde{h}_1^{c_1} \ldots \tilde{h}_N^{c_N} \wedge \sum_{i=1}^{N} c_i < L \wedge Res = \langle c, p \rangle \wedge \tau = (C, P)\right\}$$

For clarity, Res in this context is the result of the reward calculation that the user computes locally. This notation is sometimes used to compute the inner product of two other vectors (e.g., the ad interaction vector, c, and the ad policy vector, p). It should be appreciated that it is safe to link the reward request to the user 504 because the only information leaked is the actual reward earned and not any of the ads user 504 has interacted with. The common input of the proof consists of the BBA identifier, the BBA, the limit of ad interactions, and the ad policy vector.

After the reward proof is computed in operation 512, the attention application 506 transmits the reward proof to the guardian 502 in operation 514. The guardian begins checking the reward proof in operation 516 by checking the zero knowledge proof $$\prod \cdot Verif \stackrel{?}{=} T$$

Next, the guardian 502 checks whether the BBA used in the zero knowledge proof has a valid signature $$Verify (\tau, \sigma, pk) \stackrel{?}{=} 1$$

It should be appreciated that the attention application terminal 506, at the time of the reward request, opens the identifier of the BBA. This will be sufficient to mark the BBA as used, such that it cannot be the basis of a subsequent reward request, and to link the BBA to the corresponding attention application terminal 506 to make the reward payment.

As referenced above, one of the design goals of the architecture is for observers to be able to verify that the protocol is operating correctly, which means independent verification that the user 504 received the rewards payment to which she is entitled. One way to accomplish this goal is for the observers to have access to a proof calculation carried out on blockchain 508. The guardian terminal 502 can commit one or more proofs to the blockchain in operation 520 with an optional batching operation 518 wherein more than one proof is bundled into a single blockchain transaction. Although FIG. 5 illustrates operation 520 as the guardian component 502 committing the reward proofs to the blockchain 508, in other implementations, the attention application 506 can itself directly commit the reward proofs to the blockchain 508. For practical purposes, it may not be economical for the attention application 506 to commit the proofs if transaction fees on the blockchain 508 are too high. Thus, the batching operation 518 can be used to save in blockchain transaction costs. Also the guardian terminal 502 may be a more sophisticated user of the blockchain 508 than the user 504 and thus may be able to avoid overpayment of blockchain transaction fees whereas the user 504 may not be able to avoid overpayment.

Ideally, the blockchain 508 is a blockchain that can support execution of the SPS-EQ verification algorithms described herein through on-chain execution of the SPS-EQ algorithms. If blockchain 508 can support such computation, then observers need only obtain a copy of the blockchain 508, or access to a copy of the blockchain 508, to be able to confirm that the proofs are accurate. In implementations, the reward payment can also be made in the form of a token having value on the blockchain 508 so that proof verification and payment verification could be accomplished in the same set of smart contracts. In practice, however, the SPS-EQ calculations may be too complicated to be economical for the blockchain 508 to execute. As an alternative, the guardian can centrally compute the SPS-EQ algorithms and sign the BBA using a different signature scheme (e.g., a Schnorr signature), allowing the user 504 to make the reward request on-chain without an expensive signature verification procedure.

Figure 6:
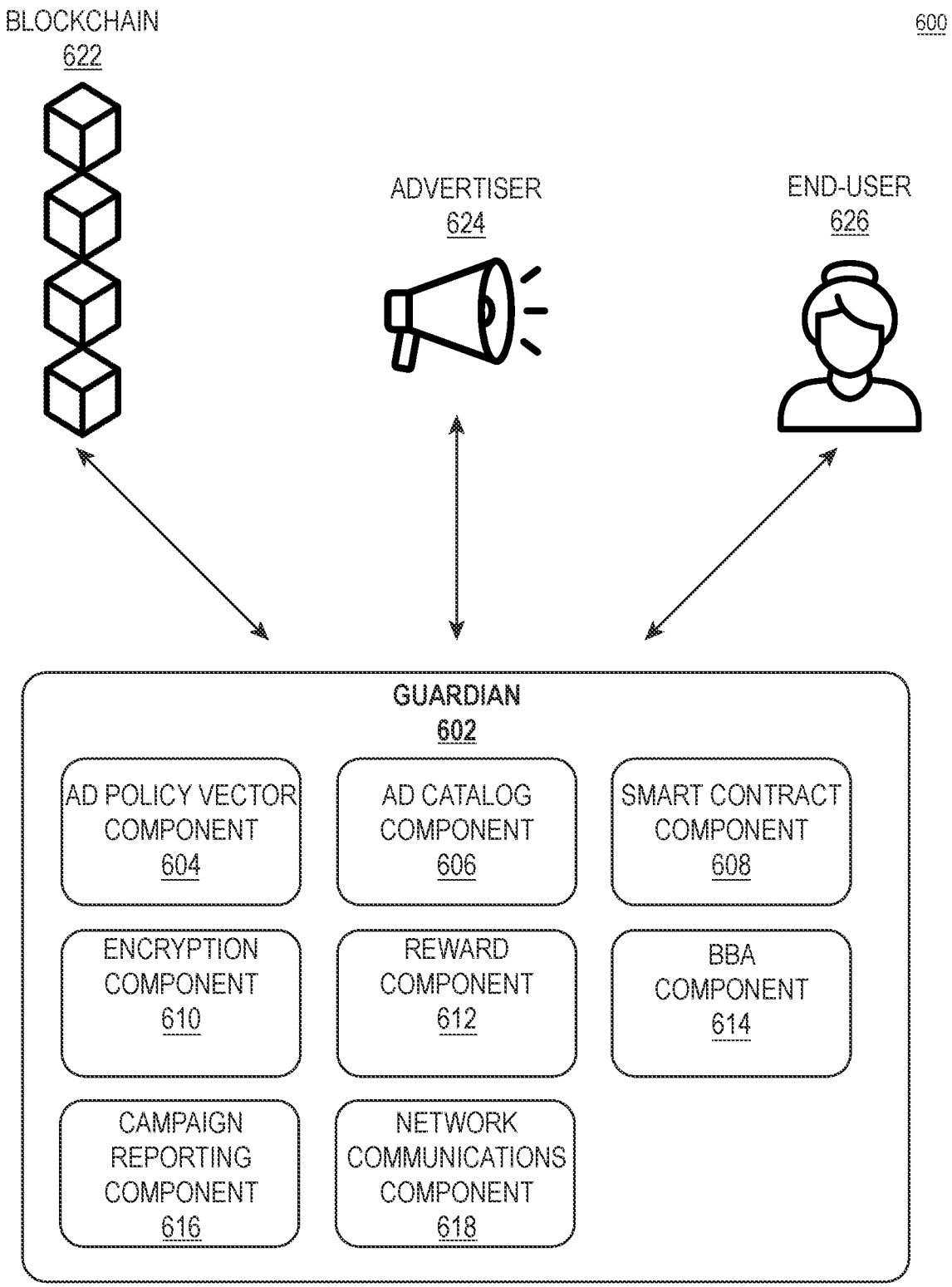
FIG. 6 is a block diagram of example components of a guardian terminal to manage advertising campaigns for advertisers in a decentralized privacy-preserving online advertising system in accordance with some embodiments.

FIG. 6 is a block diagram 600 of example components of a guardian terminal 602 performing the functions described herein and interfacing with advertisers 624 and the end user 626 in the decentralized architecture in accordance with some implementations. Components of the guardian may include computer hardware and computer software components. Examples include memories storing instructions and computer processors for executing the instructions to carry out the functions described herein. Other examples include network transceivers coupled to computer networks such as the internet for carrying out the communications functions described herein. Further examples include the human interface components for operators of the guardian 602 to instruct the components to carry out the functions described herein.

One component of the guardian 602 is the ad policy vector component 604, which negotiates an ad policy vector with the advertiser 624. In particular, the ad policy vector component receives one or more ads from the advertiser 624 for inclusion in the ad catalog to be pushed to the attention applications of the end user 626. Each ad accepted from the advertiser 624 includes a reward value to be paid to the end user 626 who interacts with the ad on an attention application. The ad policy vector component 604 arranges an ad policy vector with indices corresponding to the ads in the catalog wherein the value received from the advertiser 624 is the value of the index of the received ad. Another component of the guardian 602 is the ad catalog component 606. The ad catalog component 606 bundles an online ad into a catalog of local attention application matching with users. The ad catalog component 606 may periodically push new or updated ad catalogs to the attention applications of the end user 626. A smart contract component 608 deploys the escrow funds smart contract and the ad policy smart contract on the blockchain 622.

A encryption component 610 performs several functions of the architecture described herein. One of the functions of the encryption component 610 is the structure-preserving signatures over equivalence classes (SPS-EQ) including the enumerated algorithms of the SPS-EQ scheme: BGGen($1^\lambda$), KeyGen(BG), Sign(M, sk), Verify(M, σ, pk), and ChgRep (M, σ, f, pk). The encryption component 610 uses the SPS-EQ algorithms to check the proofs of rewards submitted by the users. The encryption component 610 also includes a keystore and a source of entropy sufficient to generate cryptographic keys and cryptographic keypairs from an address space sufficiently large to carry out the aforementioned operations. The encryption component 610 also performs the additively homomorphic encryption functions described herein.

An attention reward component 612 is operable to transmit blockchain operations and/or make requests to custodial platforms to disburse rewards to the user 626. In implementations, the attention reward component accesses blockchain funds from the escrow funds smart contract and disburses the funds according to the ad policy vector and the proof of attention from the end users. An advertiser refund component broadcasts blockchain transactions to refund the advertiser 624 if an ad campaign ends without exhausting the blockchain funds staked by the advertiser 624.

Another component of the guardian 602 is the BBA component 614. The BBA component 614 is equipped to receive requests to initialize a BBA from a new attention application, receive requests to update a BBA with a notification of which ads have been viewed by the user 626 since the last BBA update, and in cooperation with the encryption component 610, sign BBA updates. A campaign reporting component 616 aggregates campaign metrics for reporting to the advertiser 624. A network communications component performs network transmissions with the other participants, including with the blockchain 622.

Figure 7:
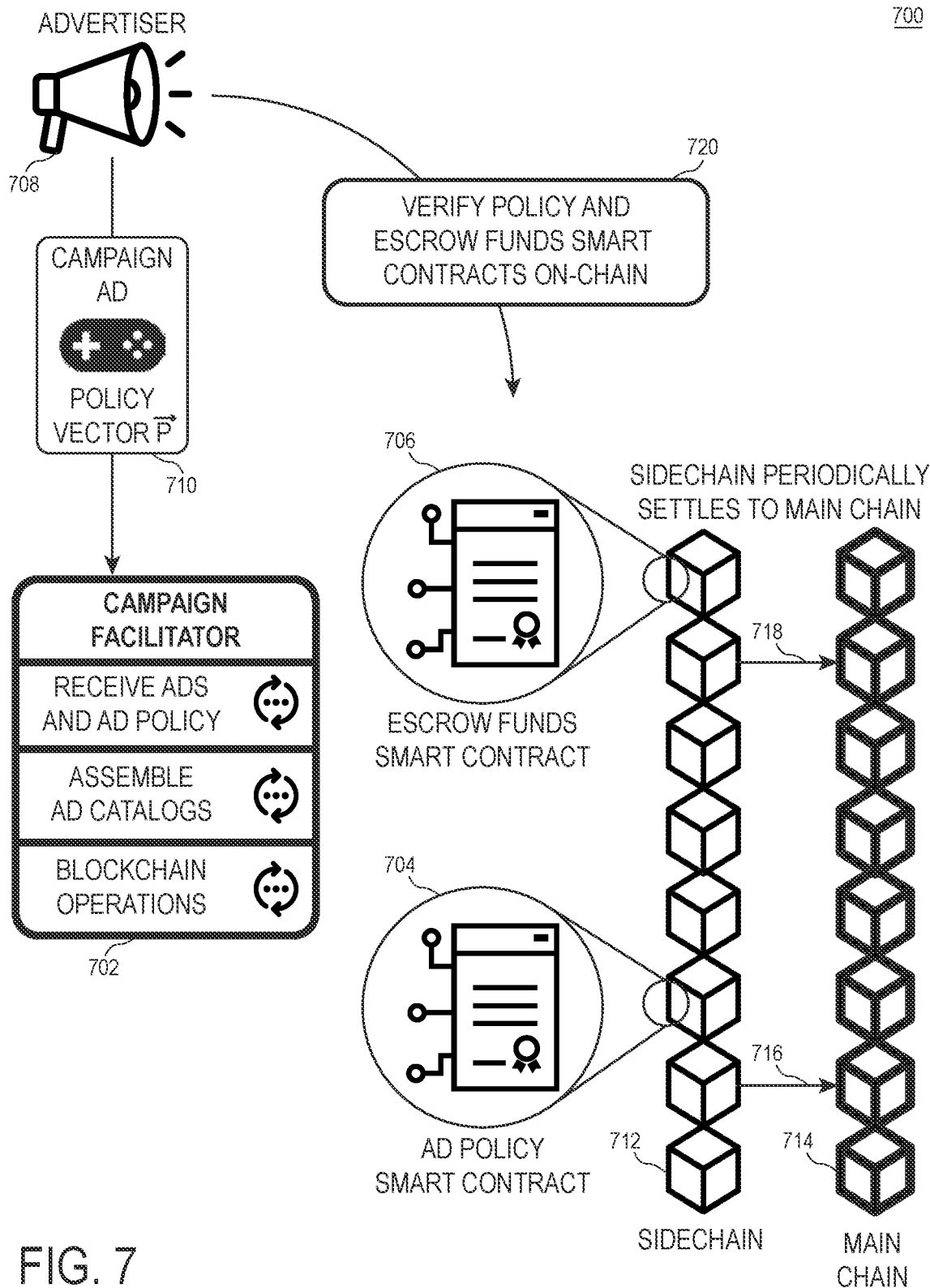
FIG. 7 is a diagram of an example alternative implementation of a decentralized privacy-preserving online advertising system including an advertising campaign facilitator deploying smart contracts to a blockchain to implement an advertising policy smart contract and an escrow funds smart contract in accordance with some embodiments.

FIG. 7 is a diagram of an example alternative implementation of a decentralized privacy-preserving online advertising system 700 including an advertising campaign facilitator 702 deploying smart contracts to a blockchain to implement an advertising policy smart contract 704 and an escrow funds smart contract 706 in accordance with some embodiments. The implementation described in FIG. 7 is an alternative implementation to the other implementations described herein. Some of the tasks of the guardian, for example, are instead performed by a smart contract on a blockchain. The alternative implementation may have some drawbacks compared to the BBA implementation, including a potential lack of scalability if blockchain transaction costs are high.

The smart contracts 704 and 706 take on some roles of a centralized authority, such as the guardian, that would need to be trusted as in the case of a non-decentralized rewards system. It should be clear in this disclosure that the term "smart contract" does not mean an ordinary legal contract in the sense of an agreement with rights and obligations among two parties and governed by contract law. Instead, a smart contract in the context should be construed to mean a program consisting of computer code and executed by a set of validators on a distributed blockchain network according to a set of consensus rules. The smart contract is a computer program with a deterministic output that is run by all the validators on the blockchain network and appended to the blockchain if all validators agree on the output of the computer program. The output of the computer program must therefore be deterministic such that all validators running the code arrive at the same output. The smart contract can rely on inputs made by participants signed by their cryptographic keys, and such inputs can involve calling specific functions of the smart contract computer program.

Smart contracts can write state data to the chain such that other smart contracts running in the future can read the state data and incorporate the same into their own smart contract programs.

In the example illustrated in FIG. 7, the smart contracts run on a sidechain 712 that settles periodically, for example at points 716, 718, to a main chain 714. The choice of side chain (and main chain) are design choices that balance needed throughput, transaction cost, cost to run the smart contracts, and security of the respective chains. It is likely that a sidechain 712 of some sort will be needed as the expected transaction cost of the system described herein at scale would be prohibitive on the existing public blockchains. Depending on the chosen blockchains, however, the system could be implemented directly on main chain 714 if the parameters of the chain are acceptable based on the expected throughput of the system.

In the arrangement 700, certain roles a centralized reward authority is replaced by the smart contracts 704 and 706 and a campaign facilitator 702. The campaign facilitator 702 is responsible to negotiate the policies of the advertisers for sponsored ads (e.g., rewards to users per cryptographically proven ad impression, how many impressions per ad will be funded by a campaign, etc.), to configure and deploy the smart contracts 704 and 706, and to handle the on-chain payments of digital blockchain assets. Although the campaign facilitator 702 will handle these tasks, the system remains decentralized because all participants can verify that all other participants run the protocol correctly, thus requiring zero trust from each other. An important result of this arrangement is that any individual, organization, and/or consortium of entities can participate as a campaign facilitator. A campaign facilitator 702 may perform operations that at first seem to require trust by other participants, for example taking possession of rewards payments sent by the escrow smart contract in order to use zero-knowledge proofs to preserve privacy and confidentiality of the disbursement blockchain transactions (e.g., rewarding users for ad interaction, refund to advertiser for unused campaign budget, fee to itself for campaign manager duties). The other participants, however, can check the math of these confidential transactions to at least show correct amounts were sent to the various recipients without revealing their identity due to use of the zero-knowledge proof transactions by the campaign manager. Thus, a cheating campaign manager would be caught, thus eliminating the need to truly trust the campaign manager as is normally the case when centralized entities control even a portion of a system.

In the example illustrated in FIG. 7, an advertiser 708 wishes to deploy an advertising campaign based on a single campaign ad 710 on the decentralized privacy-preserving online advertising system to be shown to a relevant demographic of potential consumers. To begin, the advertiser 708 transmits the sponsored ad 710 together with an ad policy vector P to the campaign facilitator 702. The ad policy vector P expresses the reward per ad impression to be paid to each viewer of the sponsored ad 710 and the scope of the campaign in terms of the number of viewings to be rewarded.

To transmit the campaign ad and policy vector P 710 to the campaign facilitator 702, the advertiser 708 exchanges a symmetric cryptographic key for each ad campaign with the campaign facilitator 702. The advertiser 708 then encrypts the corresponding ad campaign and sends it to the campaign facilitator 702 together with the ad creatives that constitute the sponsored ad itself. The campaign facilitator 702 decrypts the campaign ad and policy vector 710 to check if the policy vector P is as-agreed, then merges the encrypted policies of the different advertisers into the encrypted policy vector to yield Enc(P), and then deploys the two public smart contracts 704 and 706 corresponding to a version of an ad catalog including the campaign ad 710.

Turning now to the smart contracts 704 and 706, there are several functions performed by each smart contract. The policy smart contract 704 is responsible for billing of users' rewards and validating the payment methods. The ad policy smart contract 704 also stores the encrypted policy vector Enc(P). The escrow funds smart contract 706 is the only owner of an ad campaign's advertiser funds set aside for purposes of funding the ad campaign. In the example illustrated in FIG. 7, the advertiser funds for funding the ad campaign are a digital asset blockchain token held natively by the escrow funds smart contract 706 (e.g., an ERC20 token on the Ethereum blockchain). The escrow funds smart contract 706 is responsible for performing reward payments to users who view the sponsored campaign ad 710, refunds to the advertiser 108 if it turns out there are funds remaining at the close of the campaign, and to release processing fees to the campaign facilitator 702 if such payments are included in the policy vector P. To be clear, when it is said that the escrow funds smart contract 706 is "responsible" for these actions, it is meant the smart contract 706 includes computer code that, when executed by all the validators of the sidechain 712, changes state such that the relevant blockchain digital assets are transferred in the appropriate amount to wallets controlled by the recipient participants on the sidechain 712 or the main chain 714.

Next, the escrow funds smart contract 706 creates a vector S with the symmetric key of the advertiser 708 and the secret keys of any other advertisers who are participating in advertising campaigns on the same version of the ad catalog. The vector S is thus of the form $S=[S_1, S_2, \ldots, S_N]$, where there are N symmetric keys, and encrypts S to form a vector Enc(S) that includes each of the elements of S encrypted with the public key of the sidechain validator nodes. Then, the ad policy smart contract 104 stores Enc(S) in itself on the sidechain 712 to allow the validators of the sidechain 712 to decrypt and apply the corresponding policies on user ad interaction vectors.

Once the ad policy smart contract 704 has been deployed, the advertiser 708 can verify if Enc(P) really encodes the policies agreed upon with the campaign facilitator 702. In particular, the advertiser 708 (and any other advertisers running concurrent campaigns) fetch the Enc(P) vector from a public storage area of the ad policy smart contract 704 and decrypts the policy Enc(P[i]) using their respective symmetric key i, and verifies it is the agreed value at operation 720. Next, the advertiser 708 fetches a smart contract address of the escrow funds smart contract 706 (e.g., an address on the Ethereum network to which blockchain digital assets may be sent and held) and transfers an amount of blockchain digital assets sufficient to fund the advertising campaign thereto. The amount of funds needed is determined by the number of impressions per ad desired by the advertiser 708, its part of the agreed policy, and the processing fees to pay the campaign facilitator 702. After the campaign has ended, the advertiser 708 may receive a refund based on the final number of impressions viewed and/or clicked on by end-users. By staking the campaign's funds at operation 720, the advertiser 708 is implicitly validating and consenting to the deployed ad policy. If the advertiser 708 does not agree with the deployed ad policy, it can decline to fund the contract. Once the campaign facilitator 702 has verified that the advertiser 708 (and any other advertisers participating in campaigns running on the same version of the ad catalog, which may be a large number, depending on the size and content of that version of the ad catalog) has staked the campaign funds with the escrow funds smart contract 706, such as by checking a copy of the sidechain ledger provided by a validator or maintained by the campaign facilitator 702 itself, the campaign of the advertiser 108 is considered to have been initialized and verified.

The system disclosed herein achieves improved privacy through the use of a novel additively homomorphic encryption scheme to calculate the payout to a viewer of a sponsored ad, while keeping the user's clicks private, in a way that is auditable by the advertiser, and does not require trusting of any central authority. This system thus changes the rules of the game around online advertising. Participation can appeal to users who currently may see blocking ads as the only choice to avoid abusive practices. Local ad matching on the user's attention application using only ad matching input information permissioned for use by the user avoids interactions with web trackers running on malicious ad networks. Publishers and end users alike are compensated for attention spent on sponsored ads and for including advertising in the website by splitting the ad revenue pie among themselves instead of taking little to nothing when centralized ad networks are involved. Advertisers of sponsored ads can have cryptographic assurance that their ads were legitimately seen by users in the target demographic or consumer group and can recoup advertising budget for campaigns that fail to reach the target number of members of the target demographic or consumer group. The system is thus an improvement to the field of digital online advertising.

The novel schema for encrypted vectors representing ad policies and user interaction with ads uses the principles of additive homomorphic encryption. Encryption functions used by the scheme include at least three specific encryption functions based on public-private key pairs of the type that will be understood by users of asymmetric or public-key encryption. The key pair will be generated based on an input source of entropy sufficient to essentially guarantee the generator holds the only copy of the private key associated with the public key because it would be computationally impractical for an attacker to guess or brute force the private key independently. The first of the three functions is the encrypt function, which given the public key and a message, outputs a ciphertext, C=Enc(pk, M). Second is the decrypt function that, given a ciphertext and a private key, outputs a decrypted message, M=Dec(sk, C). Third is the signing function where, given a message and a secret key, outputs a signature on the message, S=Sign (sk, M). The additive homomorphic property is special because is guarantees that the addition to two ciphertexts, C1=Enc (pk, M1), C2=Enc (pk, M2), encrypted under the same key, results in the addition of the encryption of its messages. In other words, C1+C2=Enc (pk, M1+M2).

There are other cryptographic methods and blockchain concepts used in the system disclosed herein that will be familiar to those of skill in the art. These include use of zero-knowledge proofs, distributed key generation (DKG), and sidechains. Zero knowledge proofs allow a prover to prove to another participant (e.g., a verifier) that a certain statement is true over a private input without disclosing any other information from that input other than whether the statement is true or not. Zero knowledge proofs will allow advertisers to accept cryptographic proof that the target user viewed an ad without revealing the identity of the user or the user's clicks. DKG allows a group of participants to distributively generate the public-private key pair, which is a process normally done by a single participant. Essentially, DKG "shards" the private key such that each participant in the generation has a share of the private key but no participant ever gains knowledge of the full private key. In some cases, the private key may be sharded such that only a subset of the shard holders need to bring their shards together to create the private key sufficient to utilize the three additive homomorphic encryption functions disclosed above. DKG is used in the system disclosed herein to produce a public-private key pair for each ad campaign under which sensitive information is encrypted. The DKG scheme is thus safer than leaving the sensitive information and digital blockchain assets under a single key, which is more likely to be lost or compromised. Sidechains are a scaling solution for blockchains wherein the sidechain has a greater capacity, expected lower fees, or other operational parameters that will permit the volume of transactions needed by the system. The sidechain can periodically settle to a main blockchain that has higher security. One type of sidechain that may be used is a proof-of-authority chain, wherein the validators of the consensus rules of the chain are chosen from a semi-trusted group that may include some of the participants in the advertising system rather than relying on a computationally expensive consensus mechanism such as proof-of-work or a more complicated system relying on fair distribution of coins such as proof-of-stake.

Figure 8:
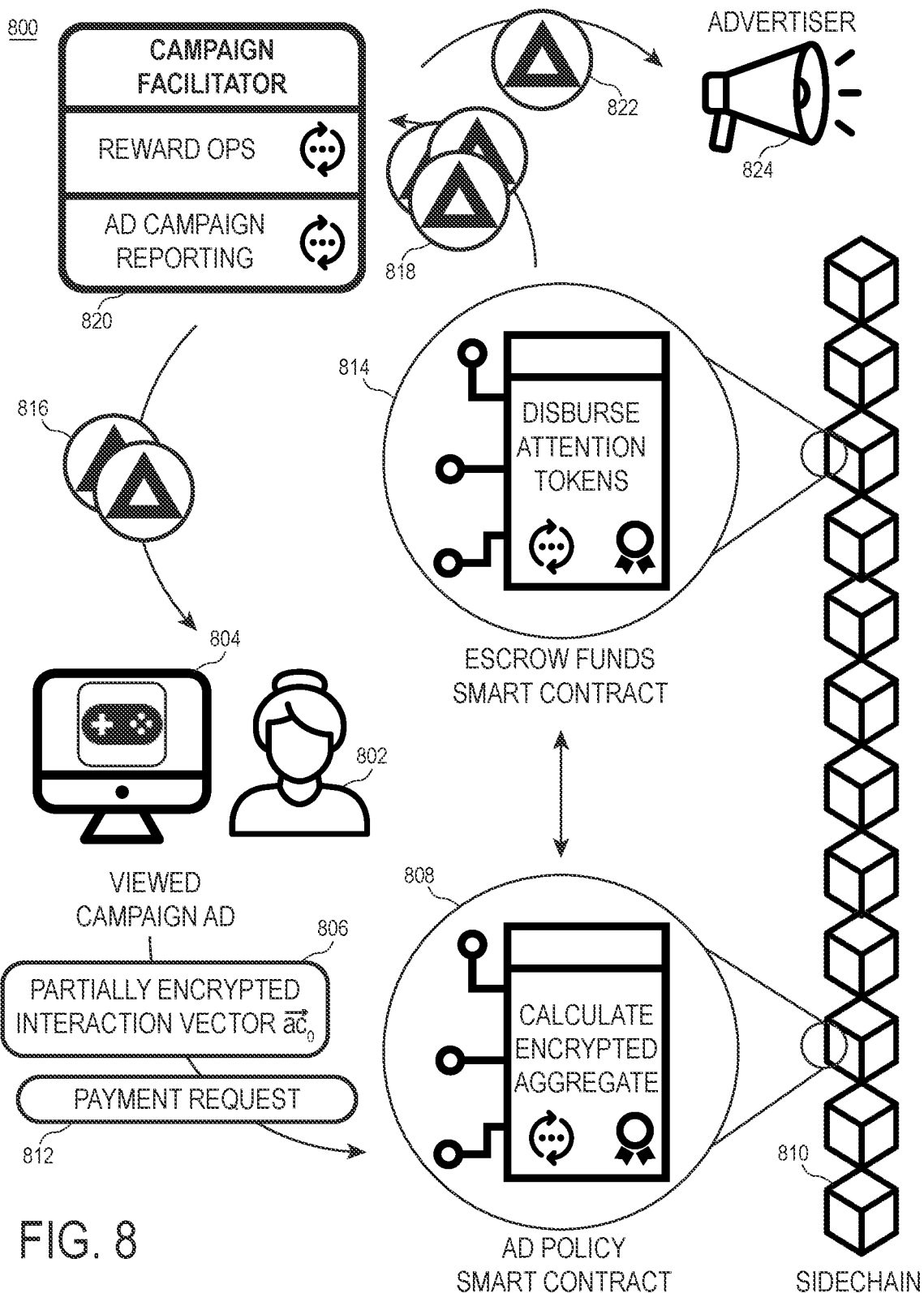
FIG. 8 is a diagram of an example alternative implementation of an end-user submitting an encrypted interaction vector to an advertising policy smart contract for calculating an encrypted aggregate and sharing the encrypted aggregate with an escrow funds smart contract that disburses viewer rewards, a campaign manager fee, and a refund to the advertiser, respectively in accordance with some embodiments.

FIG. 8 is a diagram of an example alternative implementation 800 of an end-user 802 submitting an encrypted interaction vector 806 to an advertising policy smart contract 808 for calculating an encrypted aggregate and sharing the encrypted aggregate with an escrow funds smart contract 814 that disburses viewer rewards 816, a campaign manager fee 818, and a refund to the advertiser 824, respectively in accordance with some embodiments. The system 800 is compatible with the alternative implementation described with reference to FIG. 7 and lacks some elements of the other implementations, such as a BBA. There could be drawbacks to the alternative implementation, such as uneconomical on-chain operation if the transaction costs of the blockchain are high.

When the user 802 views the campaign ad on the attention application 804, the attention application 804 creates a cryptographic proof attesting thereto. The attention application 804 creates an ephemeral cryptographic public and private key pair (pk, sk) and obtains the public threshold key generated by the consensus pool. Using these two keys, the attention application 804 encrypts an ad interaction vector representing attention of the user 802 to the campaign ad (e.g., an impression according to the ad policy governing the campaign ad) to generate two ciphertexts: (1) EncVec used to claim ad rewards and (2) EncVec' that is used for reporting to the advertiser 824. EncVec is transmitted from the attention application 804 to the ad policy smart contract 808 at operation 806.

Next, interaction vectors from many users are aggregated into an encrypted aggregate. Unlike a system depending on a centralized authority, in the system 800, the encrypted aggregate is calculated by the ad policy smart contract 808 running on the sidechain 810. As in other examples, choice of sidechain 810 could be changed to a main blockchain, depending on the relevant parameters of the chain (e.g., cost, scaling, throughput, speed, etc.). In one implementation, the attention application 804 calls a public endpoint on the ad policy smart contract 808 and transmits both ciphertexts, EncVec and EncVec'. To calculate the encrypted sum of the rewards, the user can claim, a validator on the sidechain 810 runs the ad policy smart contract 808 as follows: (1) it decrypts each policy vector P[i] using Enc(S): (2) it applies on EncVec ciphertext the additively-homomorphic property of the underlying encryption scheme; and (3) it stores the result (e.g., Aggr. Res) in a public store of the ad policy smart contract 808.

At operation 812, the user 802 may, via the attention application 804, request payment corresponding to interaction vectors in the encrypted aggregate. The attention application 804 generates a payment request that is published in the ad policy smart contract 808 containing all the information needed to receive their ad rewards. In one implementation, the attention application 804 creates an ephemeral blockchain account used only once per request, then fetches and decrypts the encrypted aggregate to get the decrypted reward, then generates the proof of correct decryption. In this way, the attention application 804 generates the payment request which consists of the following 4-tuple:

L=[Decrypted Aggregate, Encrypted Aggregate, SignReward, Proof of correct decryption]

Next, the attention application 804 encrypts L with the public key of the campaign facilitator 820 to yield Enc L=Enc (L, public key of campaign facilitator 820). Then the attention application 804 calculates the digest of the payment request by hashing L (e.g., using SHA-256 hashing function). The resulting digest is used as a commitment value for Enc L in case the campaign facilitator 820 misbehaves.

Thus, a valid payment request consists of the following tuple: $\varepsilon$=[Enc L, C], where C is the digest of the payment request.

Finally, the attention application 804 calls a public endpoint on the ad policy smart contract 808 with E as the input. The ad policy smart contract 808 stores every payment request in its public store area in a payment buffer until the escrow funds smart contract 814 has cleared them as paid by disbursing the blockchain digital asset funds. Settlement by the escrow funds smart contract 814 happens in a confidential way to preserve privacy of the system. For purposes of this disclosure, a confidential transaction in a cryptocurrency or blockchain digital asset means a transaction in which the amount of the coin transaction is concealed.

To achieve confidential transaction disbursement of payment requests, the campaign facilitator 802 fetches all payment requests from the ad policy smart contract 808, decrypts all entries, and calculates the total amount of funds required to settle all pending payments. The Next, the campaign facilitator 802 calls a public function of the escrow funds smart contract 814 requesting to transfer to an operational account owned by the campaign facilitator 802 a given amount of blockchain digital assets needed to cover the payments. If the campaign facilitator 802 were to misbehave (say, by requesting an incorrect amount of the blockchain digital assets), such misbehavior could be detected by the advertisers or users, who would be able to prove the misbehavior.

Next, the campaign facilitator 802 settles each of the pending reward payments by first verifying the proof of correct decryption, and then using a confidential payment scheme. After finalizing the payments correctly, and if there are no objections or complaints from the users or advertisers, then the campaign facilitator 802 receives it processing fees from the escrow funds smart contract 814 at 818. In case of unused staking funds, the advertiser 824 will want to be refunded. To process the refund, the escrow funds smart contract 814 utilizes the aggregate clicks per ad vector that the consensus pool has computed during the advertiser's reporting. Based on this vector and the agreed rewards, the escrow funds smart contract 814 proceeds with returning to the advertisers the unused funds.

Figure 9:
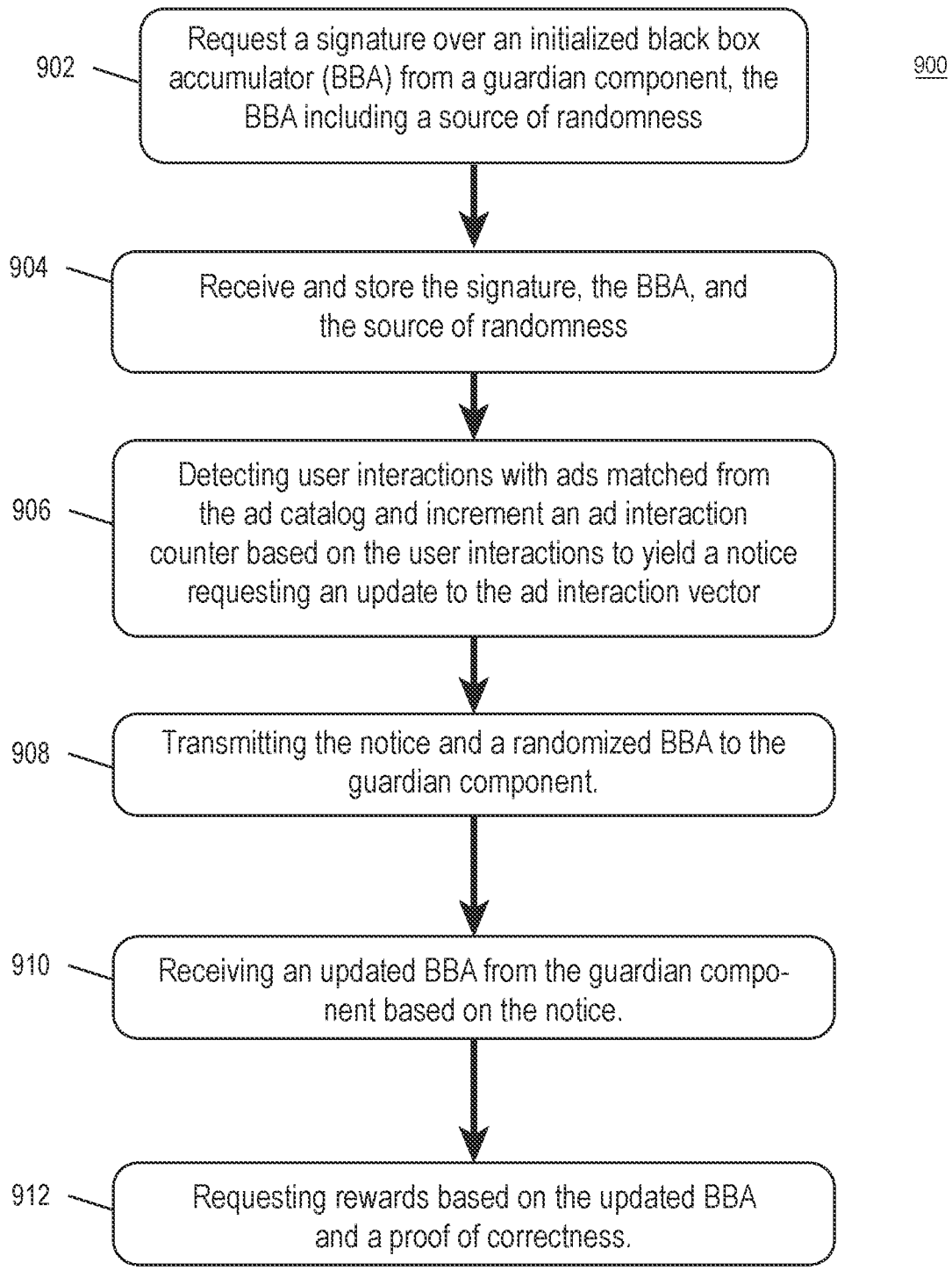
FIG. 9 is a flowchart of a workflow for establishing cryptographic communications between an attention application terminal and a guardian computing terminal with a black box accumulator (BBA) in an attention rewards architecture in accordance with some embodiments.

FIG. 9 is a flowchart of a workflow for establishing cryptographic communications between an attention application terminal and a guardian computing terminal with a black box accumulator (BBA) in an attention rewards architecture in accordance with some embodiments. An operation 902 requests a signature over a BBA from a guardian computing terminal. At the time of initialization, the BBA includes a null ad interaction vector because the user of the attention application has not yet interacted with any ads. Under the present architecture, only the guardian computing terminal may update a BBA, thus the initialized BBA is signed with a secret key owned by the guardian. Any future updates to the BBA are therefore only able to be produced with a signature by the same secret key. Operation 902 is the only time the guardian computing terminal is able to determine which ads the user has interacted with (zero). The request at operation 902 also includes a source of randomness supplied by the attention application computing system.

The receiving operation 904 receives the signature over the BBA and stores the signature, the BBA, and the source of randomness for future operations. Detecting operation 906 detects user interactions with the ads matched from the ad catalog and increments an ad interaction counter based on the user interactions to yield a notice to update the ad interaction vector. The attention application cannot directly update the ad interaction vector because only the issuing guardian computing system may update part of the BBA. The notice is therefore used to accompany requests to the guardian computing system to update the BBA accordingly. The guardian computing system may check the notice against fraud requirements (e.g., reject the notice if it claims interactions with too many ads over a period of time, if the notice comes from a known fraudulent attention application, etc.). If the notice is accepted by the guardian computing system, it can update and sign a new BBA accordingly.

Transmitting operation 908 transmits the notice and a randomized BBA to the guardian terminal. Randomizing the BBA defeats linkability between the randomized BBA and prior and future show events of the BBA. The guardian computing system therefore cannot track the user's ad interactions because it knows only the ad interactions contained in the notice and cannot decipher what ad interactions are included in the BBA. Receiving operation 910 receives the updated BBA, which is signed with the guardian secret key.

Requesting operation 912 requests rewards based on the ad interaction vector and computes a proof of correctness thereon. The guardian computing system or any other participant or observer of the system can verify the proof of correctness to know whether the requested rewards are appropriate based on the ad interaction vector and ad policy vector without knowing which ads the attention application user has interacted with. The request may be made to a public blockchain where interested parties may retrieve the reward for independent calculation. In implementations, the public blockchain may itself run smart contract code that performs the verification computations: thus observers need only check a copy of the blockchain to know whether the rewards are accurate. Observers can thus know whether the protocol is operating correctly across many users simply based on checking a copy of the public blockchain.

Figure 10:
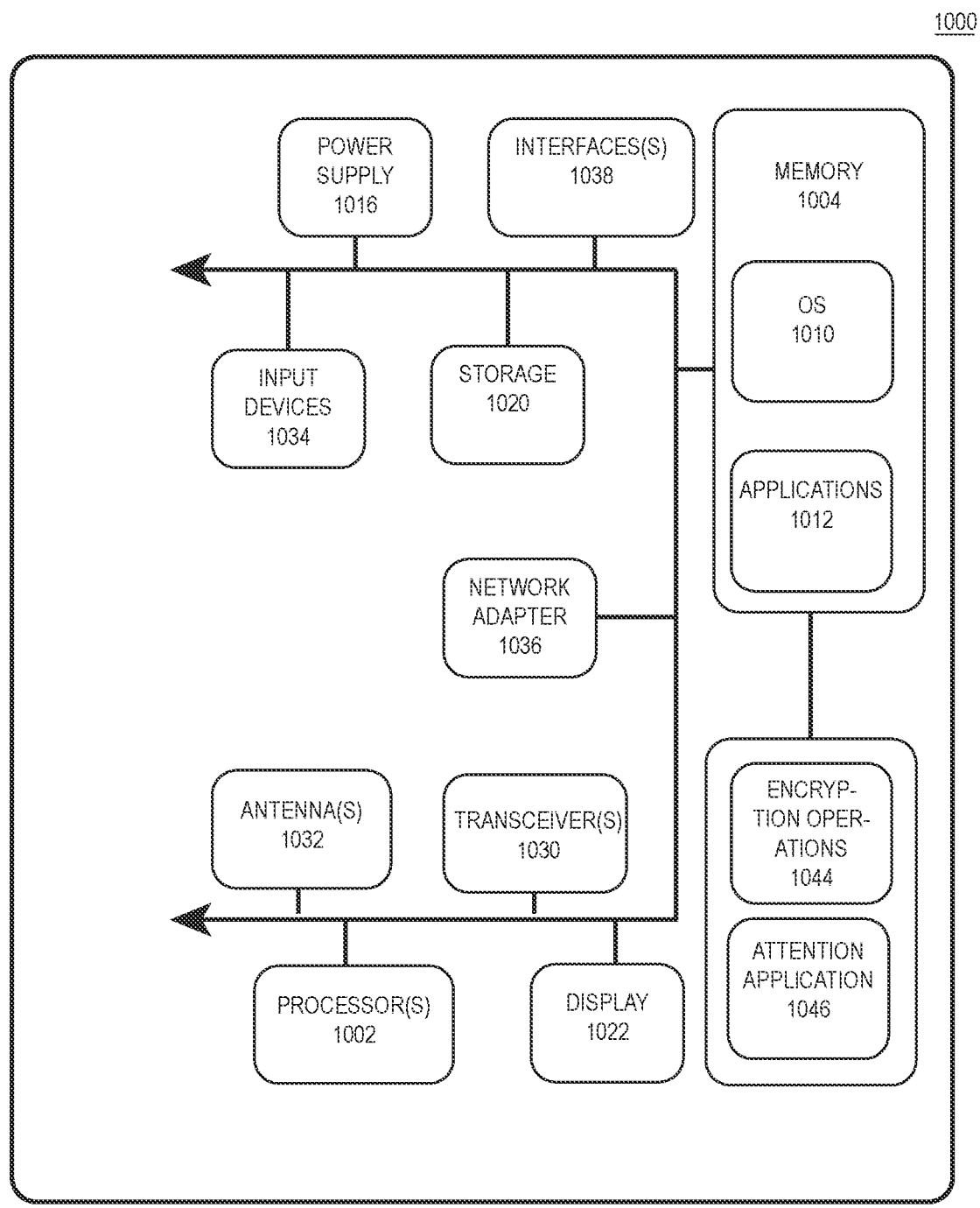
FIG. 10 is an example system that may be useful in carrying out the functions described herein.

FIG. 10 is a diagram of a system 1000 that may be useful for implementing decentralized privacy-preserving rewards with cryptographic black box accumulators. FIG. 10 illustrates an example system (labeled as a processing system 1000) that may be useful in implementing the described technology. The processing system 900 may be a client device, such as a smart device, connected device, Internet of Things (IoT) device, laptop, mobile device, desktop, tablet, or a server/cloud device. The processing system 1000 includes one or more processor(s) 1002, and a memory 1004. The memory 1004 generally includes both volatile memory (e.g., RAM) and non-volatile memory (e.g., flash memory). An operating system 1010 resided in the memory 1004 and is executed by the processor 1002.

One or more application programs 1012 modules or segments, such as encryption operations module 1044 and attention application 1046 are loaded in the memory 1004 and/or storage 1020 and executed by the processor 1002. In some implementations, the encryption operations module 1044 is stored in read-only memory (ROM) 1014 or write once, read many (WORM) memory. Data such as extrinsic event data sources may be stored in the memory 1004 or storage 1020 and may be retrievable by the processor 1002 for use by oracle manager 1044 and the attention application 1046, etc. The storage 1020 may be local to the processing system 1000 or may be remote and communicatively connected to the processing system 1000 and may include another server. The storage 1020 may store resources that are requestable by client devices (not shown). The storage 1020 may include secure storage such as one or more platform configuration registers (PCR) managed by one or more trusted platform modules (TPMs), which may be implemented in a chip or by the trusted execution environment (TEE).

The processing system 1000 includes a power supply 1016, which is powered by one or more batteries or other power sources and which provides power to other components of the processing system 1000. The power supply 1016 may also be connected to an external power source that overrides or recharges the built-in batteries or other power sources.

The processing system 1000 may include one or more communication transceivers 1030 which may be connected to one or more antenna(s) 1032 to provide network connectivity (e.g., mobile phone network, Wi-FiR, Bluetooth®, etc.) to one or more other servers and/or client devices (e.g., mobile devices, desktop computers, or laptop computers). The processing system 1000 may further include a network adapter 1036, which is a type of communication device. The processing system 1000 may use the network adapter 1036 and any other types of communication devices for establishing connections over a wide-area network (WAN) or local area network (LAN). It should be appreciated that the network connections shown are exemplary and that other communications devices and means for establishing a communications link between the processing system 1000 and other devices may be used.

The processing system 1000 may include one or more input devices 1034 such that a user may enter commands and information (e.g., a keyboard or mouse). Input devices 1034 may further include other types of input such as multimodal input, speech input, graffiti input, motion detection, facial recognition, physical fingerprinting, etc. These and other input devices may be coupled to the server by one or more interfaces 1038 such as a serial port interface, parallel port, universal serial bus (USB), etc. The processing system 1000 may further include a display 1022 such as a touch screen display.

The processing system 1000 may include a variety of tangible processor-readable storage media and intangible processor-readable communication signals including in virtual and/or cloud computing environment. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 900. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. In implementation disclosed herein includes a method for establishing cryptographic communications between an attention application terminal and a guardian terminal with a black box accumulator (BBA) in an attention rewards architecture comprising receiving an advertising (ad) catalog with N ads at the attention application terminal, receiving an ad policy vector (P) of length N, wherein each index in the ad policy vector corresponds to an ad in the catalog and represents a reward value for interactions with the corresponding ad at the attention application terminal, requesting, from the guardian terminal, a signed BBA tuple $\tau=(C^k, p^k)=(h_1^{id} \cdot h_2^r)^k, P^k)$, where $$k \xleftarrow{\$} Z_p$$

is a source of randomness (R=k) supplied by the attention application terminal with all counters initialized at zero, the initialization request including a request for a structure-preserving signature over equivalence classes (SPS-EQ), $\sigma$, over the BBA tuple $\tau$, receiving, from the guardian terminal, the signature $\sigma$, storing, at the attention application terminal, the signature $\sigma$, the BBA tuple $\tau$, and the source of randomness, R, used in the initialization request, matching ads from the ad catalog with a user of the attention application terminal, displaying matched ads to the user at the attention application terminal, detecting user interactions with the matched ads at the attention application terminal, repeatedly and automatically incrementing an ad interaction counter based on the detected user interactions to yield a notice requesting an update to the ad interaction vector, randomizing the BBA tuple $\tau$ by computing, at the attention application terminal, $\tau=(\tau_1^{k'}, \tau_2^{k'})$ where k' is chosen uniformly at random from $Z_p^*$, transmitting the randomized BBA tuple $\tau'$ to the guardian terminal with the notice requesting the update to the ad interaction vector, receiving, from the guardian terminal, an SPS-EQ over a new BBA tuple $(C_U, \tau_2')$ where $C_U=\tau_1'\cdot(\tau_2')^{sk_{c,j}}$, upon receipt of the SPS-EQ over the new BBA tuple, storing, at the attention application terminal, the updated randomization $R_{New}=R\cdot k'$, verifying the new tuple $(C_U, \tau_2')$ is a correct reflection of the ad interaction state requested in the notice requesting an update to the ad interaction vector.

An implementation of any pervious implementation includes wherein the new BBA tuple and signature owned by the attention application terminal is represented by: $(\tau_1,\tau_2)=(C^R,P^R)=((h_1^{id}\cdot h_2^r \cdot \tilde{h}_1^{c_1} \ldots \tilde{h}_N^{c_N})^N, P^R) \sigma=(Z, Y, \hat{Y})$ with $c \in \mathbb{Z}_p^N$ and R=the updated randomization $R_{New}$; de-randomizing, at the attention application terminal, the new BBA tuple by computing ChgRep($\tau$, $\sigma$, R, pk) to yield a proof of correctness of the reward owed, and generating a request for rewards based on the proof of rewards owed by disclosing the identifier of the BBA, computing the inner product between the ad interaction vector and the ad policy vector, proving the addition of all counters does not exceed a limit set by the guardian terminal, generating a zero knowledge proof of correctness and transmitting the proof of correctness to the guardian terminal, letting Res=<c, p>, wherein the zero knowledge proof of correctness is of the following form, $$\prod = SPK\left\{(r, c_1, \ldots, c_N): C = h_1^{id} \cdot h_2^r \cdot \tilde{h}_1^{c_1} \ldots \tilde{h}_N^{c_N} \wedge \sum_{i=1}^{N} c_i < L \wedge Res = \langle c, p \rangle \wedge \tau = (C, P)\right\}$$

An implementation of any previous implementation includes receiving, at the attention application, a reward based on the proof of correctness of reward owed; and zeroing out the ad interaction counter.

An implementation of any previous implementation includes wherein the operations that transmit communications from the attention application terminal to the guardian terminal are through an anonymous channel.

An implementation of any previous implementation includes wherein the operations that transmit the BBA tuple $\tau$, the randomized BBA tuple $\tau'$, and the new BBA tuple from the attention application terminal are through a broadcast encryption terminal.

An implementation of any previous implementation includes wherein the operations that transmit the BBA tuple $\tau$ and the request for rewards based on the proof of rewards owed are committed to a public blockchain by the attention application terminal.

An implementation of any previous implementation includes wherein the public blockchain includes a smart contract equipped to verify the computation of proof of rewards owned committed thereon and records a verification to the blockchain if the proof of rewards owed is correct.

In an implementation disclosed herein A decentralized system for establishing cryptographic communications with a black box accumulator (BBA) in an attention rewards architecture comprising an attention application computing system including a computer network communications interface, a memory storing instructions, and a processor that, when executing the instructions causes the processor to, request an initialized BBA from a guardian computing system, receive an initialized and signed BBA from the guardian computing system, record ad interactions with a user of the attention application computing system with ads displayed from an ad catalog to yield an ad interaction counter, randomize the BBA to yield a randomized BBA, transmit the randomized BBA and a notice requesting update of the randomized BBA according to the ad interaction counter, receive a signed and updated BBA according to the notice requesting update of the randomized BBA, generate a reward proof based on the signed and updated BBA and an ad policy vector, commit the reward proof based on the signed and updated BBA to a public blockchain.

An implementation of any previous implementation includes wherein the operation that commits the reward proof based on the signed and updated BBA to a public blockchain indirectly commits the reward proof by transmitting the reward proof to the guardian computing system.

An implementation of any previous implementation includes wherein communications between the attention application and the guardian computing system are according to an anonymous channel.

An implementation of any previous implementation includes wherein the public blockchain includes a smart contract equipped to verify the computation of proof of rewards owned committed thereon and records a verification to the blockchain if the proof of rewards owed is correct.

An implementation of any previous implementation includes wherein the communications between the attention application and the guardian computing system are according to a broadcast encryption channel wherein only qualified advertisers may read the communications under a distributed keying arrangement.

The invention claimed is:

1. A method for establishing cryptographic communications between an attention application terminal and a guardian terminal with a black box accumulator (BBA) in an attention rewards architecture comprising:
receiving an advertising (ad) catalog with a plurality of ads at the attention application terminal;

receiving, from the guardian terminal, a black box accumulator (BBA) that encodes an ad interaction vector, wherein each index of the ad interaction vector corresponds to a respective ad in the ad catalog;

displaying one or more ads to a user at the attention application terminal;

detecting user interactions with the displayed one or more ads at the attention application terminal;

incrementing an ad interaction counter based on the detected user interactions to yield a notice requesting an update to the ad interaction vector;

transmitting, to the guardian terminal, the BBA with the notice requesting the update to the ad interaction vector;

receiving, from the guardian terminal in response to the request, a new BBA that includes an updated ad interaction vector based on the notice; and verifying that the updated ad interaction vector is a correct reflection of the detected user interactions.

2. The method of claim 1, wherein transmitting the BBA with the notice comprises:

transmitting the BBA with the notice via an encrypted broadcast channel that is accessible by one or more advertisers that provide the plurality of ads of the ad catalog.

3. The method of claim 1, wherein transmitting the BBA with the notice comprises:

transmitting the BBA with the notice via an encrypted broadcast channel that is accessible by one or more advertisers that provide the plurality of ads of the ad catalog.

4. The method of claim 1, wherein transmitting the BBA with the notice comprises:

transmitting the BBA with the notice that requests a plurality of updates to the ad interaction vector based on the detected user interactions with at least a subset of ads of the plurality of ads.

5. The method of claim 1, further comprising:

receiving, from the guardian, a signature associated with the BBA; and broadcasting a message comprising the BBA and the notice via a blockchain network to cause transmission of the notice to the guardian terminal, wherein verification of the message on the blockchain network results in verification of the signature and the notice.

6. The method of claim 1, further comprising:

receiving, at the attention application terminal, transfer of an amount of tokens associated with the updated ad interaction vector.

7. The method of claim 1, further comprising:

matching, at the attention application terminal, the one or more ads to the user of the attention application terminal, wherein the one or more ads are displayed in response to matching the one or more ads to the user.

8. An apparatus, comprising:

one or more memories storing processor-executable code; and one or more processors coupled with the one or more memories and individually or collectively operable to execute the code to cause the apparatus to:

receive an advertising (ad) catalog with a plurality of ads at an attention application terminal;

receive, from a guardian terminal, a black box accumulator (BBA) that encodes an ad interaction vector, wherein each index of the ad interaction vector corresponds to a respective ad in the ad catalog;

display one or more ads to a user at the attention application terminal;

detect user interactions with the displayed one or more ads at the attention application terminal;

increment an ad interaction counter based on the detected user interactions to yield a notice requesting an update to the ad interaction vector;

transmit, to the guardian terminal, the BBA with the notice requesting the update to the ad interaction vector;

receive, from the guardian terminal in response to the request, a new BBA that includes an updated ad interaction vector based on the notice; and verify that the updated ad interaction vector is a correct reflection of the detected user interactions.

9. The apparatus of claim 8, wherein, to transmit the BBA with the notice, the one or more processors are individually or collectively operable to execute the code to cause the apparatus to:

transmit the BBA with the notice via an encrypted broadcast channel that is accessible by one or more advertisers that provide the plurality of ads of the ad catalog.

10. The apparatus of claim 8, wherein, to transmit the BBA with the notice, the one or more processors are individually or collectively operable to execute the code to cause the apparatus to:

transmit the BBA with the notice via an encrypted broadcast channel that is accessible by one or more advertisers that provide the plurality of ads of the ad catalog.

11. The apparatus of claim 8, wherein, to transmit the BBA with the notice, the one or more processors are individually or collectively operable to execute the code to cause the apparatus to:

transmit the BBA with the notice that requests a plurality of updates to the ad interaction vector based on the detected user interactions with at least a subset of ads of the plurality of ads.

12. The apparatus of claim 8, wherein the one or more processors are individually or collectively further operable to execute the code to cause the apparatus to:

receive, from the guardian, a signature associated with the BBA; and broadcast a message comprising the BBA and the notice via a blockchain network to cause transmission of the notice to the guardian terminal, wherein verification of the message on the blockchain network results in verification of the signature and the notice.

13. The apparatus of claim 8, wherein the one or more processors are individually or collectively further operable to execute the code to cause the apparatus to:

receive, at the attention application terminal, transfer of an amount of tokens associated with the updated ad interaction vector.

14. The apparatus of claim 8, wherein the one or more processors are individually or collectively further operable to execute the code to cause the apparatus to:

matching, at the attention application terminal, the one or more ads to the user of the attention application terminal, wherein the one or more ads be displayed in response to matching the one or more ads to the user.

15. A non-transitory computer-readable medium storing code, the code comprising instructions executable by one or more processors to:

receive an advertising (ad) catalog with a plurality of ads at an attention application terminal;

receive, from a guardian terminal, a black box accumulator (BBA) that encodes an ad interaction vector, wherein each index of the ad interaction vector corresponds to a respective ad in the ad catalog;

display one or more ads to a user at the attention application terminal;

detect user interactions with the displayed one or more ads at the attention application terminal;

increment an ad interaction counter based on the detected user interactions to yield a notice requesting an update to the ad interaction vector;

transmit, to the guardian terminal, the BBA with the notice requesting the update to the ad interaction vector;

receive, from the guardian terminal in response to the request, a new BBA that includes an updated ad interaction vector based on the notice; and verify that the updated ad interaction vector is a correct reflection of the detected user interactions.

16. The non-transitory computer-readable medium of claim 15, wherein the instructions to transmit the BBA with the notice are executable by the one or more processors to:

transmit the BBA with the notice via an encrypted broadcast channel that is accessible by one or more advertisers that provide the plurality of ads of the ad catalog.

17. The non-transitory computer-readable medium of claim 15, wherein the instructions to transmit the BBA with the notice are executable by the one or more processors to:

transmit the BBA with the notice via an encrypted broadcast channel that is accessible by one or more advertisers that provide the plurality of ads of the ad catalog.

18. The non-transitory computer-readable medium of claim 15, wherein the instructions to transmit the BBA with the notice are executable by the one or more processors to:

transmit the BBA with the notice that requests a plurality of updates to the ad interaction vector based on the detected user interactions with at least a subset of ads of the plurality of ads.

19. The non-transitory computer-readable medium of claim 15, wherein the instructions are further executable by the one or more processors to:

receive, from the guardian, a signature associated with the BBA; and broadcast a message comprising the BBA and the notice via a blockchain network to cause transmission of the notice to the guardian terminal, wherein verification of the message on the blockchain network results in verification of the signature and the notice.

20. The non-transitory computer-readable medium of claim 15, wherein the instructions are further executable by the one or more processors to:

receive, at the attention application terminal, transfer of an amount of tokens associated with the updated ad interaction vector.

* * * * *